US007132386B2

(12) United States Patent
Siadati et al.

(10) Patent No.: US 7,132,386 B2
(45) Date of Patent: Nov. 7, 2006

(54) PREPARATION OF AMORPHOUS SULFIDE SIEVES

(75) Inventors: Mohammad H. Siadati, El Paso, TX (US); Gabriel Alonso, Chihuahua (MX); Russell R. Chianelli, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 107 days.

(21) Appl. No.: 10/819,480

(22) Filed: Apr. 7, 2004

(65) Prior Publication Data
US 2005/0032636 A1 Feb. 10, 2005

Related U.S. Application Data

(60) Provisional application No. 60/460,951, filed on Apr. 7, 2003.

(51) Int. Cl.
*B01J 27/051* (2006.01)
(52) U.S. Cl. .................. 502/220; 502/221; 423/561.1
(58) Field of Classification Search ............... None
See application file for complete search history.

(56) References Cited

U.S. PATENT DOCUMENTS

| 687,842 A | 12/1901 | Linney |
| 4,243,553 A | 1/1981 | Naumann et al. ............ 252/439 |
| 4,243,554 A | 1/1981 | Naumann et al. ............ 252/439 |
| 4,279,737 A | 7/1981 | Chianelli et al. ............ 208/217 |
| 4,431,747 A | 2/1984 | Seiver et al. ................ 502/220 |
| 4,480,677 A | 11/1984 | Henson et al. ................ 164/46 |
| 4,508,847 A | 4/1985 | Chianelli et al. ............ 502/200 |
| 4,514,517 A | 4/1985 | Ho et al. ..................... 502/220 |
| 4,528,089 A | 7/1985 | Pecoraro et al. ......... 208/216 R |
| 4,581,125 A | 4/1986 | Steifel et al. ................ 208/108 |
| 4,650,563 A | 3/1987 | Jacobson et al. ............ 208/108 |
| 4,820,677 A | 4/1989 | Jacobson et al. ............ 502/220 |
| 4,826,797 A * | 5/1989 | Chianelli et al. ............ 502/221 |
| 4,839,326 A | 6/1989 | Halbert et al. ............... 502/220 |
| 4,880,761 A | 11/1989 | Bedard et al. ............... 502/215 |
| 4,902,404 A * | 2/1990 | Ho ............................... 208/57 |
| 5,010,049 A | 4/1991 | Villa-Garcia et al. ......... 502/60 |
| 5,057,296 A | 10/1991 | Beck ........................... 423/277 |
| 5,094,991 A | 3/1992 | Lopez et al. ................. 502/219 |
| 5,102,643 A | 4/1992 | Kresge et al. ............... 423/328 |

(Continued)

FOREIGN PATENT DOCUMENTS

CA          680160          2/1964

OTHER PUBLICATIONS

Alonso et al., "Preparation of $MoS_2$ and $WS_2$ catalysts by in situ decomposition of ammonium thiosalts," *Catalysis Letters*, 52:55-61, 1998.

(Continued)

*Primary Examiner*—David Sample
(74) *Attorney, Agent, or Firm*—Fulbright & Jaworski L.L.P.

(57) ABSTRACT

The present invention involves methods and compositions for synthesizing catalysts/porous materials. In some embodiments, the resulting materials are amorphous sulfide sieves that can be mass-produced for a variety of uses. In some embodiments, methods of the invention concern any suitable precursor (such as thiomolybdate salt) that is exposed to a high pressure pre-compaction, if need be. For instance, in some cases the final bulk shape (but highly porous) may be same as the original bulk shape. The compacted/uncompacted precursor is then subjected to an open-flow hot isostatic pressing, which causes the precursor to decompose and convert to a highly porous material/catalyst.

25 Claims, 27 Drawing Sheets

U.S. PATENT DOCUMENTS

| | | | |
|---|---|---|---|
| 5,565,142 A | 10/1996 | Deshpande et al. | 252/315.2 |
| 5,872,073 A | 2/1999 | Hilsenbeck et al. | 502/220 |
| 6,156,693 A | 12/2000 | Song et al. | 502/220 |
| 6,299,760 B1 | 10/2001 | Soled et al. | 208/254 H |
| 6,451,729 B1 * | 9/2002 | Song et al. | 502/220 |

OTHER PUBLICATIONS

Alonso et al., "Preparation of $MoS_2$ and $WS_2$ catalysts by in situ decomposition of ammonium thiosalts," *Catalysis Today*, 43:117-122, 1998.

Alonso et al., "Synthesis and characterization of tetraalkylammonium thiomolybdates and thiotungstates in aqueous solution," *Inorg. Chim. Acta*, 274:108-110, 1998.

Alonso et al., "Synthesis and characterization of tetraalkylammonium thiomolybdates and thiotungstates in aqueous solution," *Inorg. Chim. Acta*, 316:105-109, 2001.

Alonso et al., "Synthesis of tetraalkylammonium thometallates in aqueous solution," *Inorg. Chim. Acta*, 325:193-197, 2001.

Alonso et al., "Molybdenum disulfide catalysts by 'in situ' decomposition of thiosalt precursurs," 17th *North American Catalysis Society Meeting*, Ontario, Canada, Jun. 3-8, 2001.

Atkinson et al., "Fundamental aspects of hot isostatic pressing: an overview," *Metallurgical and Materials Transactions A*, 31A:2981, 2000.

Beck et al., "A new family of mesoporous molecular sieves prepared with liquid crystal templates," *J. Am. Chem. Soc.*, 114:10834-10843, 1992.

Brito et al., "Thermal and reductive decomposition of ammonium thiomolybdates," *Thermochimica Acta*, 256:325, 1995.

Brownlee, *Statistical Theory and Methodology in Science and Engineering*, 2nd Ed., Wiley, NY, 590, 1965.

Chianelli et al., "Symmetrical synergism and the role of carbon in transition metal sulfide catalytic materials," *Catalysis Today*, 53:357-366, 1999.

Chianelli et al., "Low-temperature solution preparation of group 4B, 5B, and 6B transition-metal dichalcogenides," *Inorg Chem.*, 17(10):2758, 1978.

Chianelli et al., "Amorphous and poorly cryatalline transition metal chalcogenides," *International Reviews in Physical Chemistry*, 2:127, 1982.

U.S. Appl. No. 60/460,862, entitled "Molybdenum Sulfide/Carbide Catalysts," and shares inventors Chianelli and Alonso, (UTSE:092US).

Cramer et al., "The molybdenum site of nitrogenase, 2. A comparative study of Mo-Fe proteins and the iron-molybdenum cofactor by X-ray absorption spectroscopy," *J. Am. Chem. Soc.*, 100:3814, 1978.

EPA Regulatory Announcement EPA420-F-00-057, Dec. 2000.

*Federal Register*, "Control of air pollution from new motor vehicles: tier 2 motor vehicle emissions standards and gasoline sulfur control requirements," 65(28):6701, 2000.

Frommell et al., "An x-ray diffraction and ESCA study of the transformation of ammonium tetrathiomolybdate to $MoS_2$," In: *Proc. 12th North American Meeting of Catalytic Soc.*, Lexington, KY, PD-38, 1991.

Frye et al., "Kinetics of hydrodesulfurization," *Chem. Eng. Prog.*, 63:66, 1967.

Fuentes et al., "The influence of a new preparation and method on the catalytic properties of CoMo and NiMo sulfides," *J. Catal.*, 113:535-539, 1988.

Girgis et al., "Reactivities, reaction networks, and kinetics in high-pressure catalytic hydroprocessing," *Ind. Eng. Chem. Res.*, 30:2021, 1991.

Houalla et al., "Hydrodesulfurization of methyl-substituted debenzothiophenes catalyzed by sulfided $C0-Mo/\gamma-Al_2O_3$," *J. Catal.*, 61:523, 1980.

Inamura et al., "The role of Co in unsupported Co-Mo sulfides in the hydrodesulfurization of thiophene," *J. Catal.*, 147:515-524, 1994.

Iwata et al., "Catalytic functionality of unsupported molybdenum sulfide catalysts prepared with different methods," *Cat. Today*, 45:353-359, 1998.

Jiang et al., "Synthesis and structure of microporous layered tin (IV) sulfide materials," *J. Mater. Chem.*, 8:721-732, 1998.

Kistler, "Coherent expanded aerogels and jellies," *Nature*, 127:741, 1931.

Kresge et al., "Ordered mesoporous molecular sieves synthesized by a liquid-crystal template mechanism," *Nature*, 359:710-712, 1992.

Land et al., "Processing of low-density silica gel by critical pint drying or ambient pressure drying," *J. Non-Cryst. Solids*, 283:11, 2001.

Laudise, In: *The Growth of Single Crystals*, 278-281, Prentice-Hall, Englewood Cliffs, NJ, 1970.

Leist et al., "Semiporous MoS2 obtained by the decomposition of thiomolybdate precursors," *J Mater. Chem.*, 8:241, 1998.

Liang et al., "Structure of poorly crystalline $MoS_2$-a modeling study," *J. Non-Crystalline Solids*, 79:251-273, 1986.

Lobachev, In: *Crystallization Processes under Hydrothermal Conditions*, Consultants Bureau, NY 1973.

Ma et al., "A review of zeolite-lie porous materials," *Micropourous and Mesoporous Materials*, 37:243-252, 2000.

McDonald et al., "Syntheses and characterization of ammonium and tetraalkylammonium thiomolybdates and thiotungstates," *Inorg. Chem Acta*, 72:205-210, 1983.

Morey and Niggli, "The hydrothermal formation of silicates, a review," *J. Am. Chem. Soc.*, 35(9):1086-1130, 1913.

Müller and Newton, In: *Nitrogen Fixation: Chemical, Biochemical, Genetics Interfaces*, Plenum Press, NY, 1982.

Müller, In: *Transition Metal Chemistry-Current Problems of General, Biological and Catalytical Relevances*, Verlag Chemie, Weinheim, 1981.

Nava et al., "Cobalt-molybdenum sulfide catalysts prepared by in situ activation of bimetallic (Co-Mo) alkylthiomolybdates," *Catalysts Leters*, 86(4):2003.

Pan et al., "Facile syntheses of new molybdenum and tungsten sulfido complexes. Structure of $Mo_3S_9^{2-}$," *Inorg. Chem.*, 22:672-678, 1983.

Prasad et al., "Thermal decomposition of $(NH_4)_2MoO_2S_2$, $(NH_4)_2MoS_4$, $(NH_4)_2WO_2S_2$ and $(NH_4)_2WS_4$," *J. Inorg. Nucl. Chem.*, 35:1895-1904, 1973.

Rabenau, "The role of hydrothermal synthesis in preparative chemistry," *Angew. Chem.*, (English Ed.), 24:1026-1040, 1985.

Ramanathan et al., "Characterization of tungsten sulfide catalysts," *J. Catal.*, 95:249-259, 1985.

Roy, "Accelerating the kinetics of low-temperature inorganic syntheses," *J. Solid State Chem.*, 111:11-17, 1994.

Smith et al., "Shrinkage during drying of silica gel," *J. Non-Cryst. Solids* 188:191, 1995.

Swain, "U.S. refiners face declining crude quality, insufficient price spread," *Oil & Gas J.*, 1:62-65, 1993.

*Hydrotreating Catalysis-Science and Technology*, Springer, Anderson and Boudart eds., 1996.

Vasudevan et al., "Characterization of supported molybdenum sulfide catalyst ex ammonium tetrathiomolybdate," *Appl. Catal.*, 112:161-173, 1994.

Vrinat et al., "A comparison of some catalytic properties of unsupported $MoS_2$ and $WS_2$ catalysts promoted by group VIII metals," *Bull. Soc. Chim. Belg.*, 93:637, 1984.

Waldron et al., *Sintering*, Heyden, London, p. 62, 1978.

Wasielewski et al., "Elimination of casting defects using HIP," *Proc 2nd Int. Conf. Superalloys Processing*, TMS-AIME, Champion, PA, pp. D-1-D-24, 1972.

Weisser et al., In: *Sulphide Catalysts: Their Properties and Applications*, Pergamon Press, NY, 1973.

Wilkinson et al., "Characterization of supported tungsten sulfide catalysts ex ammonium tetrathiotungstate," *J. Catal.*, 171:325-328, 1997.

Yoshimura and Suda, "Hydrothermal processing of hydroxyapatite: past, present, and future," In: *Hydroxyapatite and Related Materials*, Brown and Constanz (Eds), 45-72, CRC Press, Inc., 1994.

Zhang et al., "TPD and HYD studies of unpromoted and co-promoted molybdenum sulfide catalyst ex ammonium tetrathiomolybdate," *J. Catal.*, 157:53, 1995.

\* cited by examiner $(NH_4)_2MoS_4 + 2(Pen)_4NBr \longrightarrow [(Pen)_4N]_2MoS_4 + 2NH_4Br$ Desorption diagrams form BET showing the pore size distribution for MoS₂ catalysts produced in-situ from various precursors. The narrowest pore size distribution belongs to TPenATM.

PREPARATION OF AMORPHOUS SULFIDE SIEVES

The present application claims the benefit of U.S. Provisional Application Ser. No. 60/460,951 filed on Apr. 7, 2003. The entire text of the above-referenced disclosure is herein incorporated by reference.

The government may own rights in the present invention pursuant to grant number DE-FC04-01AL67097 from the U.S. Department of Energy.

BACKGROUND OF THE INVENTION

1. Field of the Invention

The present invention relates generally to catalysts and molecular sieves. In particular, the present invention relates to methods and compositions concerning catalytic and amorphous sulfide sieve materials.

2. Description of Related Art

Molecular sieves are microporous or mesoporous materials with pores of a well-defined, substantially uniform diameter in the range of less than about 20 Å (microporous) and between about 20 and about 500 Å (mesoporous). Most molecules, whether in the gas or liquid phase, both inorganic and organic, have dimensions that fall within either of these ranges for their operating environments. Selecting a molecular sieve with a suitable pore size therefore allows separation of a molecule from a mixture through selective adsorption, hence the name "molecular sieve". Apart from the selective adsorption and selective separation of uncharged species, the well-defined pore system of a molecular sieve enables selective ion exchange of charged species and selective catalysis. In the latter two cases, significant properties other than the porous structure are, for instance, ion exchange capacity, specific surface area and acidity.

Molecular sieves can be classified in various categories, for example according to their chemical composition or by their structure (e.g., crystalline, amorphous). Traditional molecular sieve materials include crystalline sieve materials such as zeolites and metal silicates. Zeolites are crystalline aluminum silicates with well defined, versatile pore structures that make them useful in a wide variety of applications. Similarly, metal silicates are structurally analogous to zeolites except that they do not contain aluminum or only very small amounts thereof. They are typically based on oxide frameworks.

Metallic sulfides are another type of sieve material. They are a relatively new family of sieves based on sulfide chemistry. An example of early sulfide sieve materials is disclosed in Bedard et al., U.S. Pat. No. 4,880,761. Bedard disclosed a process for preparing a crystalline, metallic sulfide composition having a three-dimensional, micro-porous framework structure of $MS_2$, where M is a metal such as germanium or tin, and S is sulfur (or selenium). Bedard teaches that the sulfide sieve material is formed by reacting a mixture of a templating agent, an anion, a metal sulfide, and water at a temperature, pressure and time sufficient to form the crystalline composition. Bedard teaches that the resulting crystalline three-dimensional microporous composites exhibit adsorption/desorption properties and fluorescence showing that this family of sieves have applications in adsorptive separations, as luminescent display materials, luminescent sensor substrates, and as catalysts, and catalyst supports in metal sulfide-based catalysts such as in hydrogenation, dehydrogenation, dehydration, hydrotreating and conversion reactions.

Other sulfide sieve materials have also recently been developed. (See, e.g., *Microporous and Mesoporous Materials*, 37 (2000) 243–252). They have typically been close analogs of oxide-based, microporous materials. Most of these newly synthesized microporous sulfide materials have layered structures. For example, SnS is a good semiconductor and is used in chemical sensing devices. Jiang et al (1998) have prepared large single crystals of SnS-n materials. The S-S-1 series $A_2Sn_3S_7$ ($A^+=Et_4N^+$, $Me_4N^+$, and mixture of $NH_4^+$ and $Et_4N^+$) has hexagonal-shaped 24-atom rings with diameters of about 10.5 Å in the tin sulfide layer, and interlamellar spacings of 8.5–9.0 Å depending on the templates. $(Et_4N)_2Sn_3S_7$, which has 24-atom rings partially occupied by the template, selectively adsorb $H_2O$ over $CO_2$. The SnS-3 series [$A_2Sn_4S_9$ ($A^+=Pr^n{}_4 N^+$ and $Bu^n{}_4 N^+$)] has elliptical 32-atom rings of 20×10 Å in size within the tin sulfide layer, and an interlamellar spacing of 14 Å. The tin sulfide trigonal bipyramidal and tetrahedral connecting units make the tin sulfide layer very flexible, and this can undergo elastic deformation to alter the void spaces within and between the layers to accommodate the size and shape of the templates.

Another type of recently developed sulfide sieve material is $MoS_2$ having a large surface area (60 $m^2/g$) and pore size (110 Å in diameter). For example, it has been synthesized via decomposition of $(NH_4)_2Mo_3S_{13}xH_2O$ under heating and vacuum treatment (Leist et al., 1998). High-resolution transmission electron microscopy (HRTEM) shows an interlayer spacing of 6–7 Å, and unusually bent lamellae. This bent lamellar structure makes $MoS_2$ an effective lubricant. Driving out the volatile species from the precursor under vacuum assists the $MoS_2$ in forming lamellae with curvature and large pores.

The above-described sieve materials are generally crystalline in structure with atoms and channels that are arranged in complete regularity. Unfortunately, forming such crystalline sieve materials can be difficult and costly in that they typically require relatively expensive precursor solution materials and template removal processes. In addition, they are generally not well suited for reactions with large molecules (e.g., greater than 13 Å).

Another type of sieve materials are amorphous (or non-crystalline) materials. Even though they are not crystalline in structure, they have generally uniform, porous morphologies that allow them to be used in various sieve applications. For example, a group of researchers at Mobil Co. recently reported a series of mesoporous molecular sieves, named the M41S series including MCM-41 and MCM-48, which are noncrystalline (or amorphous) materials. (See U.S. Pat. Nos. 5,057,296 and 5,102,643). These mesoporous molecular sieves have regularly arranged channels larger than those of existing zeolites, thus enabling their application to adsorption, isolation or catalyst conversion reactions of relatively large molecules. The sieves consist of a structure in which mesopores uniform in size are regularly arranged. In contrast to crystalline sieves that have been produced by using inorganic or organic cations as templates, these mesoporous molecular sieves are synthesized through a liquid crystal template pathway by using surfactants as templates. These mesoporous molecular sieves have the advantage that their pore sizes can be adjusted in a range of 16 to 100 Å by controlling the kinds of surfactants or synthetic conditions employed during the production process.

There is a need, however, for new molecular sieves and methods for making such sieves, particularly methods that simplify the process or ones that generate improved molecular sieves.

SUMMARY OF THE INVENTION

In this study, a new approach is undertaken in synthesizing porous materials/catalysts. By applying an open-flow hot isostatic pressing technique, the catalyst may be produced directly from the desired precursor in an open-flow system with $H_2$ as both the reducing agent and pressure medium. Depending on the materials involved and the desired environment, other gases or a combination of gases may be used as pressure medium. First the isostatic pressure is applied to the starting material/catalyst precursor, and then the heat is applied. Under this condition, as the organic components gradually decompose and leave the material, the voids left behind are immediately filled/replaced by the gas (pressure medium) in flow. This substitution warrants the preservation as well as the uniformity of the voids/pores. This process, taking place in the absence of any solvent, would produce clean porous catalysts devoid of any undesirable residues. Furthermore, the process is simpler and less costly than the previous processes, rendering a viable technique for mass-producing porous materials/catalysts. The resulting materials are termed "amorphous sulfide sieves" to reflect their unique properties that include high surface area, narrow pore size distribution and high activity. The catalysts are potentially licensable to all petroleum and petroleum chemical companies for a wide variety of environmental and product improvement purposes. Thus, the process broadly is to produce any metal sieve material using suitable precursors described herein, i.e., ATM, TBATM, etc., and those similar to such precursors.

The process for forming highly porous catalysts or amorphous sulfide sieves of the present invention involves two basic steps. Initially, a suitable precursor, such as tetrapentyl ammonium thiomolybdate (TPenATM), is subjected at room temperature or higher (depending on the material, the starting temperature may be higher than room temperature, too) to the desired isostatic pressure using a desired flowing gas. Next, the system is heated to create the desired hot isostatic pressing ("HIP") environment in which the thiomolybdate precursor thermally decomposes and converts into porous $MoS_2$.

As the precursor decomposes and its organic components are released, the voids generated are filled by the gas employed as pressure medium resulting in uniformly distributed pores that are also substantially uniform in size. After the precursor has thermally decomposed and converted into porous $MoS_2$, the system is cooled to room temperature and the highly porous $MoS_2$ molecular sieve material is removed.

In one embodiment, the precursor is placed in a reactor that is pressurized at room temperature to a steady-state isostatic pressure, e.g., 500 psig. Heat is next applied so as to raise the temperature at a sufficiently low rate to a decomposition temperature, and the sample is left to decompose for a suitable amount of time. The temperature is raised slowly so that the precursor substantially or fully decomposes. Under this condition, as the organic components gradually decompose and depart from the precursor, the voids left behind are immediately filled by the gas (pressure medium) in flow. This substitution results in the preservation, as well as the uniformity, of the pores. The final result is a very porous material with very uniform pore size distribution.

A beneficial aspect of the use of a continuous gas flow is that it allows the removal of the organic components out of the reactor. Thus, the entire process takes place under a continuous flow of the gas that is used as the pressure medium to develop the isostatic pressure. Consequently, the production process, as well as the final product produced, can be made devoid of undesirable residues, which results in a very clean overall process. Furthermore, the process may be unsupported.

In some embodiments, the invention concerns a process for producing a metal sulfide sieve material by heating a composition comprising a molybdate or thiomolybdate salt in a pressurized gas environment until the salt fully decomposes, so that pores are formed in the salt from voids left from organic components departing from the decomposing salt and are filled by the pressurized gas to preserve the pores. In some embodiments, the heating is applied so that the temperature increases 2–4° C. per minute, and the rate may be 1, 2, 3, 4, 5, 6, 7, 8, 9, 10, 15, 20° C./minute or higher, and ranges therein.

The term "decompose" refers to the departure of organic components and the phrase "fully decomposes" or "decompose fully" refers to having all volatile organic components depart so that what remains is the stable organic compound/material. It is contemplated that after a material is decomposed, that the resulting material has lost all or some of its organic components, and that a fully decomposed material is a stable organic compound/material. In some embodiments of the invention, the metal sulfide sieve is a catalyst of the formula $MoS_{2-x}C_x$ with $0 \leq x \leq 1$. In some aspects of the invention, the composition that is heated also contains tungsten. In some embodiments, the metal sulfide sieve is a catalyst of the formula $Mo_{1-y}W_yS_{2-x}C_x$ with $0 \leq y \leq 1$ and $0 \leq x \leq 1$. The tungsten may be in the composition as part of a molybdate or thiomolybdate salt or in the composition as its own salt along with the molybdate or thiomolybdate salt. Thus, in some embodiments, the composition includes a tungstate or thiotungstate salt. Alternatively, it is contemplated that any method of the invention involves the tungstate or thiotungstate salt in the absence of any molybdenum.

In some aspects of the invention, the gas in a system is pressurized to between about 20 and 5000 psig. For the $MoS_2$ system, as pressure was increased up to 1400 psi, the activity increased linearly, and higher pressures are expected to exhibit similar increases. Throughout this application, the term "about" is used to indicate that a value includes the standard deviation of error for the device or method being employed to determine the value. It is contemplated that the gas may be pressured to at least, at most, or at the following pressure: 20, 30, 40, 50, 60, 70, 80, 90, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, or 5000 or more psig, or any range therein. In some embodiments, the gas is pressurized to about 500 psig. The gas serves as a pressure medium, and thus, it is contemplated that other pressure media may be implemented to achieve the desired pressure. Steam (water) can be used as the pressure medium, or any other desired gas. Different pressure media may be implemented, and it is contemplated that the pressure medium may be changed during the process, if need be. In specific embodiments, the pressure medium may be a mixture of gases such as $H_2/H_2S$.

The pressure medium may be used as a carrier gas to intake other precursor(s) into the reactor to allow combining with the material already inside the reactor. This may allow processes such as physical vapor deposition (PVD) and chemical vapor deposition (CVD) to take place. For instance, while TPenATM precursor is being converted to unsupported, unpromoted $MoS_2$ with $H_2$ as pressure medium (gas in flow), the Co may be carried in by the pressure medium in flow as a second precursor to promote the $MoS_2$ either during the TPenATM being converted or right after its conversion into $MoS_2$.

Furthermore, an appropriate binder may be carried in by the pressure medium to allow adequate mechanical strength for unsupported catalyst production.

In further embodiments, the process involves a metal sulfide salt that comprises molybdenum. In certain cases, the salt is a molybdenum sulfide salt. In some aspects of the invention, the salt is ammonium thiomolybdate, alkyl ammonium thiomolybdate, tetrapentylammonium thiomolybdate, or polyalkyl ammonium thiomolybdate, wherein the term "alkyl" refers to a straight or branched chain hydrocarbon containing 3 to 18 carbon atoms. In specific embodiments, the alkyl contains 4 to 6 carbon atoms. It will be understood that the salt may include a compound commercially known as "Aliquat" (CAS# 5137-55-3), which is a long chain tetraalkylammonium salt (typically the chloride) with one chain having an average chain length of 18. Furthermore, it is contemplated that the salt may include benzyltributylammonium chloride $\{C_6H_5CH_2N[(CH)_3CH_2]_3Cl\}$. Furthermore, the salt may be the decomposition product of tetrapentyl ammonium thiomolybdate. In other embodiments, the salt is an oxide salt.

More generally, the invention may involve catalysts with the following formula: $Mo_{1-y}W_yS_{2-x}C_x$ with $0 \leq y \leq 1$ and $0 \leq x \leq 1$. Mixed Mo/W catalysts, tungsten disulfide compositions and catalysts with improved surface areas can be used as part of the invention. The steps and embodiments described below with respect to $MoS_2$ and carbon-containing molybdenum disulfide ($MoS_{2-x}C_x$) catalysts can be used as steps and embodiments with respect to $Mo_{1-y}W_yS_{2-x}C_x$ with $0 \leq y \leq 1$ and $0 \leq x \leq 1$ compositions. The invention may further involve catalysts comprising rhenium.

In some embodiments, if need be, the process further comprises compacting the salt prior to heating and/or breaking the salt into suitably sized pieces prior to heating.

The process of the invention may be varied according to the temperature to which the system or gas within the system is heated. The term "system" simply refers to the chamber or apparatus in which the heating is conducted. In some embodiments, the system or gas is heated to a temperature of about 200° C. to about 600° C. In others, the system or gas is heated to a temperature of about 300° C. to about 400° C. It is contemplated that the temperature may be at least, at most, or at the following temperature: 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500 or more ° C., or any range therein. Furthermore, the temperature may be up to 70% of the value of the melting temperature of the starting composition or salt therein. Finally, it is contemplated that the system may be heated to a temperature suitable for that particular situation and the materials involved. The materials of our interest have been toward synthesis of high activity catalytic materials, $MoS_2$ in particular. For these materials, the thermogravimetric analysis (DTA) studies show that the starting temperature for complete conversion to $MoS_2$ is around 350° C. The melting point of $MoS_2$ is 1185° C., but it starts subliming at around 450° C. 70% of 450° C. is 315° C. and excellent results have obtained in between 300–400° C. Higher temperatures may also be applied, but possibly at the risk of losing catalytic activity. For $RuS_2$, which is another catalytic material, the best synthesis temperature seems to be between 250–350° C.

In aspects of the invention, the gas environment comprises a flowing gas environment. It is contemplated that in many embodiments, the flowing gas environment is open during all or part of the synthesis of the metal sulfide sieve. In some embodiments, the flowing gas environment is closed during all or part of the synthesis of the metal sulfide sieve and open after synthesis of the metal sulfide sieve to remove undesirable organic reaction products. It is contemplated that the gas may be hydrogen if a reducing environment is necessary, which can be suitable to generate high porosity and catalytic activity in the resulting product. In other embodiments of the invention, nitrogen may be used, which can be used to generate high porosity. For example, pure hydrogen has been used with tetra butyl ammonium thiomolybdate (TBATM) and tetra pentyl ammonium thiomolybdate (TPATM) and ammonium thiomolybdate (ATM) resulting in very porous catalysts possessing high activity. On the other hand, when pure nitrogen was applied with TBATM and TPATM, the resulting materials are very porous but possess poor activity. Therefore, if both high porosity and activity are of concern, then the gas environment would have to be reducing as well, and thus a gas such as hydrogen would be the ideal choice. On the other hand, if only high porosity is needed, then nitrogen gas is shown to be the ideal choice. The pressure medium may be changed during the process if need be. The pressure medium are contemplated to include, but not be limited to, a mixture of gases such as $H_2/H_2S$, $N_2/H_2S$, $H_2/N_2$, $CO_2$, steam, and/or air. It is generally understood as well that self-generated gases from the precursors may be used, such as $H_2S$ or any other reducing gas.

In some embodiments, the molybdate or thiomolybdate salt is impregnated with a promoter salt. It is contemplated that the promoter salt may be a metal selected from the group consisting of Co, Ni, Fe, and Ru. In other embodiments, the composition may include an inorganic binder selected from the group consisting of $Al_2O_3$, $TiO_2$, $SiO_2$, and MgO.

In some aspects of the invention, the invention concerns a method of characterizing a metal sulfide sieve. In some embodiments, pore size and/or pore size distribution are characterized. In further embodiments, the method includes subjecting the metal sulfide sieve to small angle x-ray scattering (SAXS) or BET. In other embodiments, the metal sulfide sieve that is characterized is a catalyst of the formula $Mo_{1-y}W_yS_{2-x}C_x$ with $0 \leq y \leq 1$ and $0 \leq x \leq 1$.

The invention also concerns compositions of matter that include a metal sulfide sieve produced by the claimed methods. The metal sulfide sieve, in some embodiments, is characterized by one or more of the following parameters: fractal pore distribution, surface area, Porod Value, and Guinier Value. In specific embodiments, the metal sulfide sieve has a fractal pore distribution with fractal cutoffs between about 30 angstroms and about 10000 angstroms. In particular embodiments, the fractal pore distribution is about, at least about, or at most about 30, 40, 50, 60, 70, 80, 90, 100, 200, 300, 400, 500, 600, 700, 800, 900, 1000, 2000, 3000, 4000, 5000, 6000, 7000, 8000, 9000, or 10000 or more angstroms, or any range derivable therein. In other embodiments, the metal sulfide sieve has a surface area of about, at least about, or at most about 100, 200, 250, 300, 350, 400, 450, 500, 550, 600, 650, 700, 750, 800, 850, 900, 950, or 1000 or more m²/g, or any range derivable therein.

In further embodiments, the metal sulfide sieve has a Porod Value of about, at least about, or at most about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 or more, or any range derivable therein. In still further embodiments, the metal sulfide sieve is characterized by a Guinier Value of about, at least about, or at most about 10, 11, 12, 13, 14, 15, 16, 17, 18, 19, 20, 21, 22, 23, 24, 25, 26, 27, 28, 29, or 30 or more angstroms, or any range derivable therein.

It is contemplated that any aspect of the invention discussed in the context of one embodiment of the invention may be implemented or applied with respect to any other embodiment of the invention.

The use of the term "or" in the claims is used to mean "and/or" unless explicitly indicated to refer to alternatives only or the alternative are mutually exclusive, although the disclosure supports a definition that refers to only alternatives and "and/or."

Throughout this application, the term "about" is used to indicate that a value includes the standard deviation of error for the device or method being employed to determine the value.

The use of the word "a" or "an" when used in conjunction with the term "comprising" in the claims and/or the specification may mean "one," but it is also consistent with the meaning of "one or more," "at least one," and "one or more than one."

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 1–8 are similar to figures found in the reference of Alonzo et al.

FIG. 2. Thermogravimetric analysis (TGA) results for five of the tetraalkylammonium compounds. The $MoS_2$ material appears after a weight loss of around 80% and temperature of 350° C.

FIG. 3. The in situ process shown schematically.

FIG. 4. XRD patterns of $MoS_2$ catalysts produced in situ from various thiomolybdate precursors.

FIG. 5. Surface areas of $MoS_2$ catalysts produced in situ from various precursors.

FIG. 6. Desorption diagrams from BET showing the pore size distribution for $MoS_2$ catalysts produced in situ from various precursors. The narrowest pore size distribution belongs to TPenATM.

FIG. 7. Activity results for $MoS_2$ catalysts produced in situ from various thiomolybdate precursors.

FIG. 8. When consolidating a powder (or a pre-shaped high-performance castings) to develop a specified shape and size, the powder is first placed into a can or envelope of the same shape as that specified, but of a larger overall size.

DESCRIPTION OF ILLUSTRATIVE EMBODIMENTS

Figure 1:
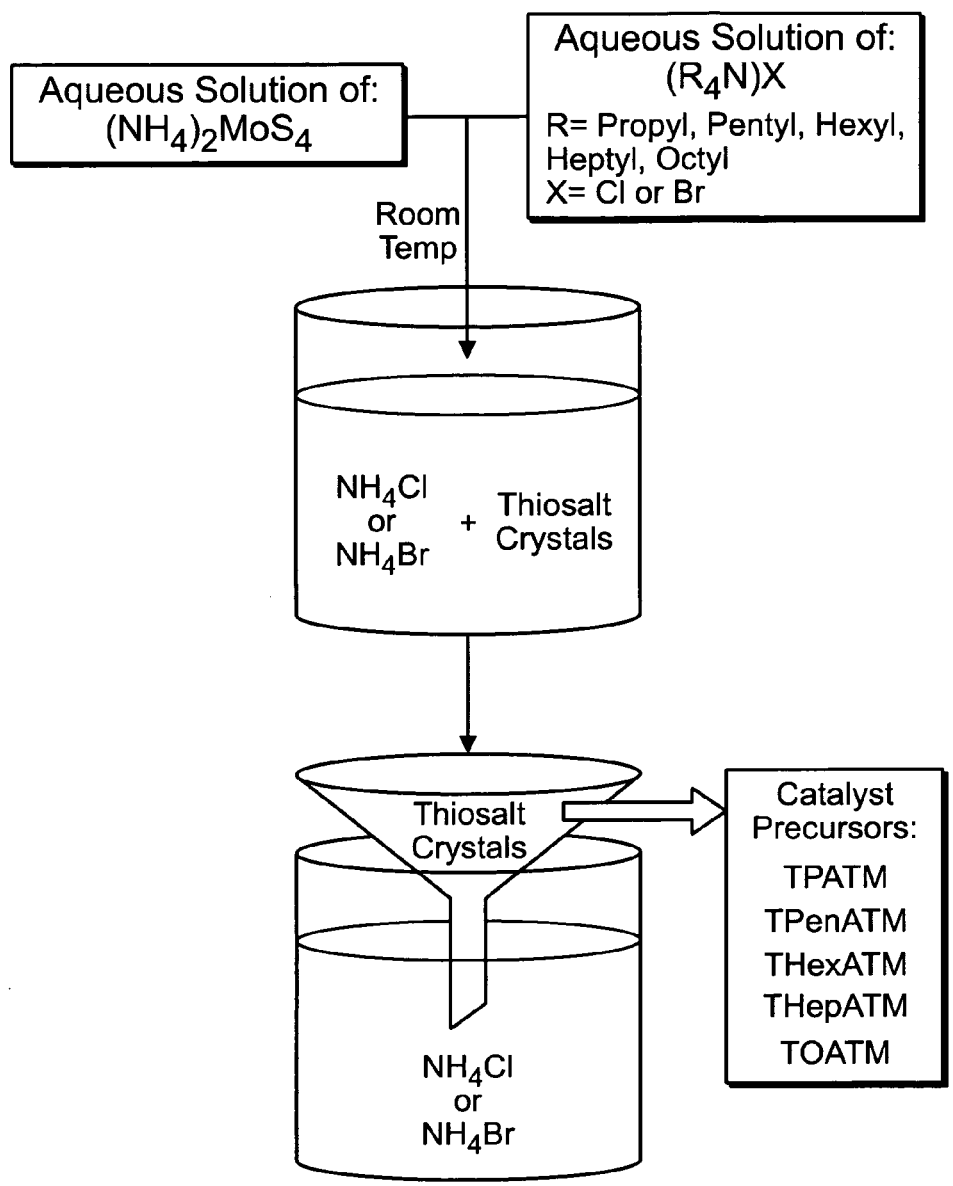
FIG. 1. Synthesis of catalyst precursors using aqueous solution method.

The invention provides a novel technique for mass-producing improved amorphous sieve materials that, among other things, are highly useful as catalysts for a wide variety of applications such as hydrotreating processes. Some of the processes are employed in the petrochemical area. The resulting amorphous, sulfide sieve materials have unique properties including high surface area, narrow pore size distribution, and high activity.

The sieve material is produced directly from a precursor salt without the need for solvent, which renders the production process simpler and less costly than previous processes. Moreover, the process takes place under the flow of the gas used as the medium to develop isostatic pressure. Consequently, the process and the product will be made devoid of undesirable residues.

A. Petroleum Industry

Two constituents of all petroleum crude materials are sulfur and nitrogen. They retain in the liquid-transportation and heating fuels produced from the petroleum crude materials. Upon combustion in transportation vehicles, sulfur and nitrogen react with oxygen and two byproducts $SO_x$ and $NO_x$ are generated. These are both polluting to the environment and hazardous to the human health. Removing the sulfur and nitrogen from the fuels during the refining process of the petroleum crude materials can minimize the generation of these two byproducts. This is accomplished at the refinery in a process known as hydrotreating: hydrodesulfurization (HDS) for sulfur removal and hydrodenitrogenation (HDN) for nitrogen removal. In this process, the petroleum feedstock (crude oil or refined product) is passed through a reactor at elevated temperature and in an atmosphere of $H_2$ gas at high pressure. The removal of sulfur and nitrogen under these conditions requires the presence of a material known as catalyst. The fuel comes in contact with the catalyst housed in the reactor. The level to which the sulfur and nitrogen are removed from the fuel in the refining process defines the effectiveness or catalytic activity of the catalyst involved.

Hydrotreating is one of the most important catalytic processes in the petroleum industry. Catalysts used for this purpose account for 10% of the annual sales of the total market of catalysts. Although various hydrotreating processes have been in service since the 1930's, the technology remains the target of vigorous research to lower costs and meet increasingly stringent specifications for sulfur content of fuels. For example, the new regulations by the Environmental Protection Agency (EPA) require that most refiners and importers meet a corporate average gasoline sulfur standard of 120 ppm and a cap of 300 ppm beginning in 2004, and by the year 2006 the cap will be reduced to 80 ppm (Federal Register 2000) at an estimated cost of four to five cents per gallon (EPA Regulatory Announcement 2000).

A catalyst is a substance that alters the rate of a chemical reaction, and itself is not consumed in the reaction. A more specific usage applies the term catalyst to a substance that increases the rate of a chemical reaction versus the term inhibitor referred to a substance that retards the rate of a chemical reaction. Catalysts speed the reaction by lowering the activation energy of the reaction. However, they do not change the thermodynamics of the reaction nor the equilibrium composition.

The transition metal sulfides (TMS) form a very important group of materials exhibiting a number of interesting properties. One particular chemical property of several of these sulfides is the ability, in the presence of hydrogen, to catalyze sulfur removal from heterocyclic organic molecules such as thiophene, benzothiophene, and dibenzothiophene (Weisser et al., 1973). The TMS of molybdenum and tungsten, in particular, have been widely used for years in the petroleum industry as hydrodesulfurization (HDS) catalysts (Weisser et al., 1973; Topsoe et al., 1996).

B. Supported Catalysts

For hydrotreating processes, the conventional catalysts currently being used are transition metal sulfide materials based on $MoS_2$ or $WS_2$ The catalytic phase is promoted with a metal such as Co or Ni and they are collectively but finely distributed in the pores of a supporting material. The supporting material is normally $Al_2O_3$. Therefore, the general composition of these catalysts contains $Co/MoS_2/Al_2O_3$ or $Ni/MoS_2/Al_2O_3$. The Co or Ni acts as a promoter increasing the hydrotreating activity. The concentrations of these metals and Mo in the catalyst body are typically in the ranges of 3–5 wt % and 10–20 wt %, respectively. The balance is the $Al_2O_3$ support. In recent years, the catalyst manufacturers have been increasing the amount of Mo in these catalysts to enhance their catalytic activity. This has been undertaken with the sole purpose of meeting the ever more stringent government regulations for sulfur and nitrogen removal.

Regulations in the United States continue to lower the levels of sulfur and nitrogen that is permitted to remain in the fuels. This is also true in Europe and other parts of the world. The increasingly strict regulations governing sulfur and nitrogen reduction from fuels have rendered the current hydrotreating capability of supported catalysts inadequate.

C. Unsupported Catalysts—Higher Performance

The obvious and simplest way to increase the overall catalytic performance in any given reactor beyond the current levels would be by increasing the amount of the active phase, $MoS_2$ or $WS_2$, in the reactor. Since the reactor volume is fixed, the increase in the amount of active phase can only be accomplished by the elimination of the $Al_2O_3$ support, while maintaining the high surface area and structural integrity of the catalysts.

Unsupported HDS catalysts have been prepared by different methods, including comaceration Beck et al., 1992), homogeneous sulfide precipitation Kresge et al., 1992), thiosalt decomposition (Alonso et al., 1998a; U.S. Pat. No. 6,299,760). The thiosalt decomposition method has been widely used in the preparation of molybdenum and tungsten sulfide catalysts for hydrotreating processes (Alonso et al., 1998a). The catalytic properties of $MoS_2$ and $WS_2$ obtained by these methods are reported to depend strongly on the processing atmosphere, as well as heating conditions (Beck et al., 1992; Kresge et al., 1992; Alonso et al., 1998a). Large variations in surface area have been observed for $MoS_2$ and $WS_2$ catalysts, from a few to several hundred square meters per gram, depending on the decomposition conditions (Brownlee 1965; Prasad et al., 1973). Metal-promoted unsupported catalysts prepared from decomposition of thiosalts have shown higher catalytic activities than catalysts prepared by other techniques (Vrinat et al., 1984). Some newly synthesized catalysts have surface areas that equal or exceed those of current commercial catalysts and they exhibit corresponding improvements in hydrotreating activity. In addition, these catalysts have unusual pore size distributions. For example, catalysts produced by these techniques have narrow pore size distributions with all pores lying in the region of 40 Å (Alonso et al., 2001a).

D. Choice of Catalyst Precursor

The ideal catalyst should possess sufficiently high surface area to render the highest catalytic activity possible. Most often, surface area and catalytic activity are directly proportional in any given system, i.e., the higher the surface area, the higher the catalytic activity. Studies have shown that the catalyst precursor plays a major role in obtaining a final catalyst that would show the most suitable catalytic properties. It is well known that the catalyst precursor's physical and chemical nature/state determine the physical and catalytic properties of the final catalyst. It has been discovered that the template formulation surrounding the metal sulfide in any given precursor would determine the final catalytic properties of the resulting catalyst (Alonso et al., 2001a).

The decomposition of thiosalt precursors has been shown to be very effective as a method for obtaining better catalysts because the thiosalt precursors have sulfur already bound to the metal atoms in a tetrahedral coordination, and their decomposition involves a topotactic reaction, whereby the c-axis of sulfide remains the same as in the precursor (Frommel et al., 1991). In a series of studies on thiosalt decomposition, Alonso et al. (2001a) have shown that TPenATM has properties that can be used in the context of the invention.

Catalysts that may be used in the invention include those described in the provisional application with U.S. Ser. No. 60/460,862 entitled "Molybdenum Sulfide/Carbide Catalysts," filed in the names of Gabriel Alonso, Russell R. Chianelli, and Sergio Fuentes on Apr. 7, 2003. This application is specifically incorporated by reference. The nonprovisional application claiming priority to U.S. Ser. No. 60/460,862, entitled "Molybdenum Sulfide/Carbide Catalysts" and filed in the names of Gabriel Alonso, Russell R. Chianelli, and Sergio Fuentes on Apr. 7, 2004, is also specifically incorporated by reference.

E. Catalysis

The principal theme in catalysis is the desire to enhance the rate of chemical reactions. It is particularly of crucial importance for the chemical industry. The number of catalysts applied in the industry for catalysis purposes is very large and catalysts come in many different forms, from heterogeneous catalysts in the form of porous solids over homogeneous catalysts dissolved in the liquid reaction mixture to biological catalysts in the form of enzymes.

In the petroleum industry, the challenge has been to process petroleum residues because of the large sizes and structural complexity of their molecules, high boiling point range, and high contents of sulfur, nitrogen and metals. At the same time, it has become clear that crude oils in many existing reserves are heavier and higher in sulfur contents than those already recovered (Swain 1993). As a consequence, there is a growing interest in research and development for converting heavy feedstock (petroleum residues and heavy oils) into lower boiling products of high quality and lower sulfur content. Therefore, hydrodesulfurization (HDS) of heavy petroleum feedstock to produce distillate fuels, particularly diesel fuels and gasoline (either directly or via subsequent fluid catalytic cracking) has become an important research subject.

Earlier research has shown that certain sulfur compounds are easier to convert and the reactivities of the 1- to 3-ring sulfur compounds decrease in the order of thiophene>benzothiophene>dibenzothiophene Girgis et al., 1991). It has also been shown that under mild conditions, conventional catalysts are not effective for converting bulky organo-sulfur compounds, particularly 4-methyl and 4,6-dimethyl substituted benzothiophenes (Houalla et al., 1980; Frye et al., 1967). Hence, it has become necessary to develop catalysts for converting bulky sulfur compounds in order to produce environmentally friendly transportation fuels.

F. Catalyst Precursors

There have been numerous investigations on thiometallate compounds for applications such as biological systems (Cramer et al., 1978a; Cramer et al., 1978b; Muller et al., 1982) and particularly catalyst precursors (U.S. Pat. Nos. 4,528,089; 4,650,563; 4,243,554; 4,514,517; 4,508,847). Among the thiometallate compounds, thiomolybdates and thiotungstates are well known precursors for molybdenum and tungsten disulfide catalysts, respectively. They are used extensively in the hydrodesulfurization and hydrodenitrogenation processes.

1. Preparation of Catalyst Precursors

Preparation of catalyst precursors has been of considerable interest. Different methods have been used in preparing these precursors. Some tetraalkylammonium thiometallates such as $[(Et)_4N]_2MS_4$ (M=Mo or W) were prepared by McDonald et al. (1983). They synthesized the materials by stoichiometric reaction of ammonium thiomolybdate (ATM) or ammonium thiotungstate (ATT) with tetraalkylammonium hydroxide ($R_4NOH$) or chloride ($R_4NCl$) in methanol or acetonitrile solution. Pan et al. (1983) and Liang et al. (1986) prepared alkylthiomolybdate and alkylthiotungstate sulfide complexes as $[(Et)_4N]_2M_3S_9$ (M=Mo, W) by heating $(NH_4)_2MS_4$ (M=Mo, W) in dimethyl formamide at 358 K (for Mo) or 403 K (for W) under anaerobic conditions. However, these experimental procedures are inconvenient due to very slow rates of formation.

Figure 2:
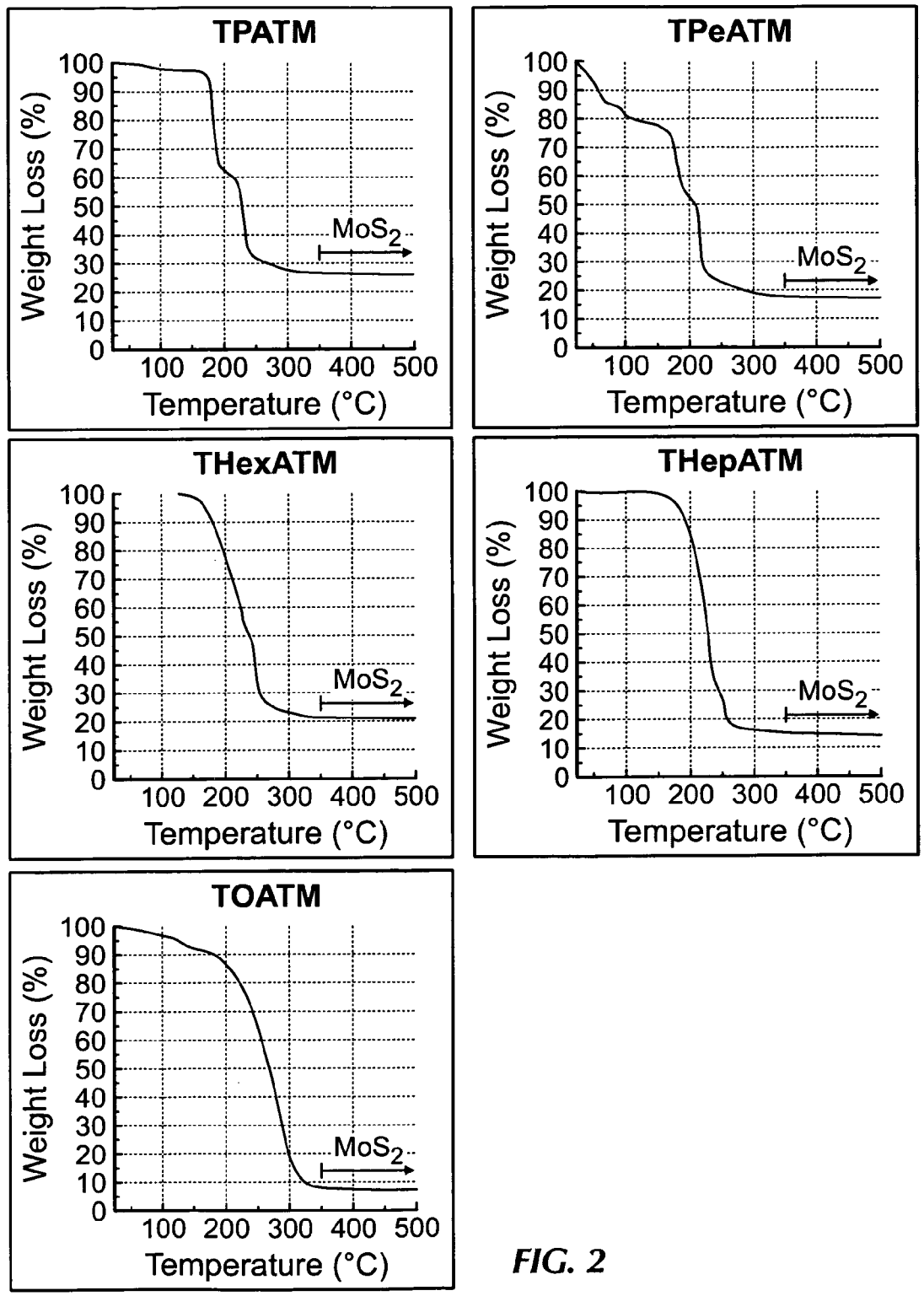

Alonso et al. (1998b) have reported a simpler aqueous solution method that significantly improves the yield of tetraalkylammonium compounds compared to previous studies. The aqueous solution method involves a one-step rapid substitution of $[NH_4]^+$ ions from ammonium thiomolybdate (ATM) and/or ammonium thiotungstate (ATT) with the respective ions of the desired salts. Two aqueous solutions prepared separately are added together at room temperature (in most cases) in rigorous stirring. Finally, the crystallites formed are filtered, rinsed and dried. The process is simple, fast, non-hazardous, and consequently economical. FIG. 1 schematically shows the steps involved in synthesizing some of the tetraalkylammonium compounds. FIG. 2 shows the thermogravimetric analysis (TGA) results for five of the tetraalkylammonium compounds. Two salient features observed in all five compounds are the percent weight loss and the temperature at which the final remnants become monolithic $MoS_2$ materials. In most cases, the $MoS_2$ material appears after a weight loss of around 80% and temperature of 350° C.

Alonso et al. (2001a) have reported extensive characterization data illustrating that the aqueous solution method does indeed produce precursors most suitable for unsupported catalyst synthesis.

Specifically, precursor preparation can be done according to the following two methods. These methods are collectively and informally referred to as the "BRENDA" method of precursor preparation. In the first method, begin by weighing 1 g of ammonium thiomolybdate (ATM). Next, weigh 0.4452 g of $CoCl_2$ hex hydrated. Next, at room temperature, dissolve 1 g of ATM in 20 ml of distilled water. Then, dissolve 0.4452 g of $CoCl_2$ hex hydrated in 10 ml of distilled water. Finally, mix both solutions by stirring. A black precipitate will be obtained. Filter this precipitate in a vacuum. The filtered precipitate can then be placed inside a batch reactor to synthesize the catalyst.

In the second method, begin by weighing 1 g of ammonium tiomolybdate (ATM). Next, weigh 2.91 g of pentyl ammonium bromide. Next, dissolve 1 g of ATM in 20 ml of distilled water. Then, dissolve 2.91 g of pentyl ammonium bromide in 50 ml of a mix 5:1 of isopropanol/distilled water. Stir the mixture with a magnetic stirrer for 15 minutes. Then, add the ATM solution to pentyl ammonium bromide solution while agitation continues, and let it stir for 15 more minutes. Next, filter the solution in a vacuum. An orange precipitate will be obtained. Extend the precipitate in a dish to let it dry at room temperature. The precipitate is air sensitive, and therefore limited exposure is recommended. Once the precipitate is dried, weight it (X g) and dissolved it in 50 ml of a solution 1:1 ethanol/water with agitation. Then, dissolve Y g of $CoCl_2$ hex hydrated in 10 ml of distilled water. Use 0.1415 g (Y) of $CoCl_2$ hex hydrated for every 1 g (X) of precipitate obtained. Next, mix both solutions, and a black sticky precipitate will be obtained. Filter the precipitate. The filtered precipitate can then be placed inside a batch reactor to synthesize the catalyst.

G. Catalyst Production/Synthesis

The process/method of converting the catalyst precursors to final catalysts has been under enormous investigations. Conventionally, active sulfide catalysts have been prepared by converting the respective oxides to sulfides in a reductive atmosphere such as hydrogen sulfide. Reductive sulfiding of the oxides is usually difficult and does not proceed in a regular manner (Wilkinson et al., 1997). Some alternative methods include the thermal decomposition of the corresponding salts (Muller 1977) and low temperature precipitation from solution (Chianelli 1978). Materials obtained by these routes have an amorphous or poorly crystalline structure, depending on the temperature of preparation. Another method involves the decomposition of tetraalkylammonium thiometallates $(NH_4)_2MS_4$ (M=Mo or W) at 673 K and two hours in a flowing gas mixture of 10% $H_2S/H_2$ yielding transition metal catalysts $MoS_2$ or $WS_2$ (Iwata et al., 1998). Thiosalt decomposition is interesting as a method for obtaining better catalysts; the thiosalts have sulfur already bound to the metal atoms in a tetrahedral coordination, and their decomposition has been reported to undergo a topotactic reaction, where the c-axis of sulfide remains the same as in the precursor (Frommell 1991).

Figure 3:
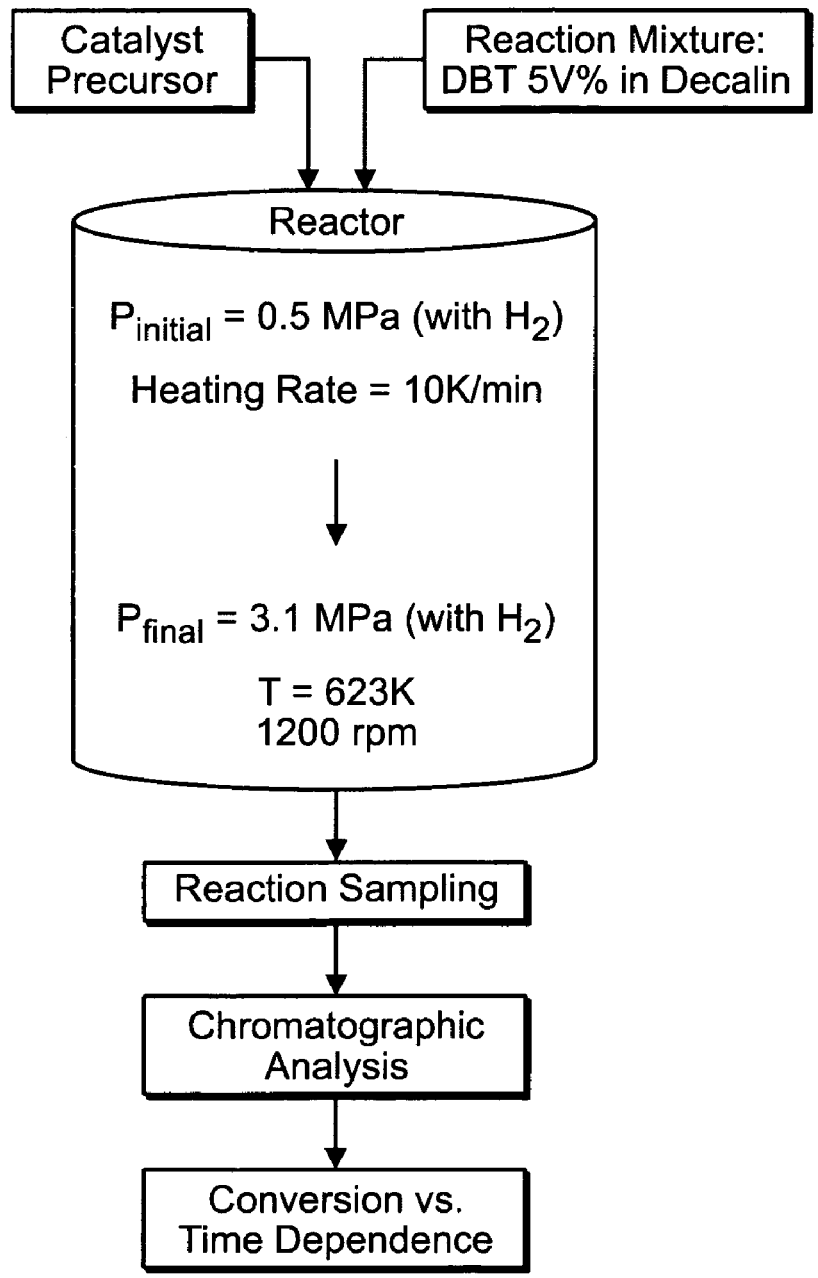
Figure 4:
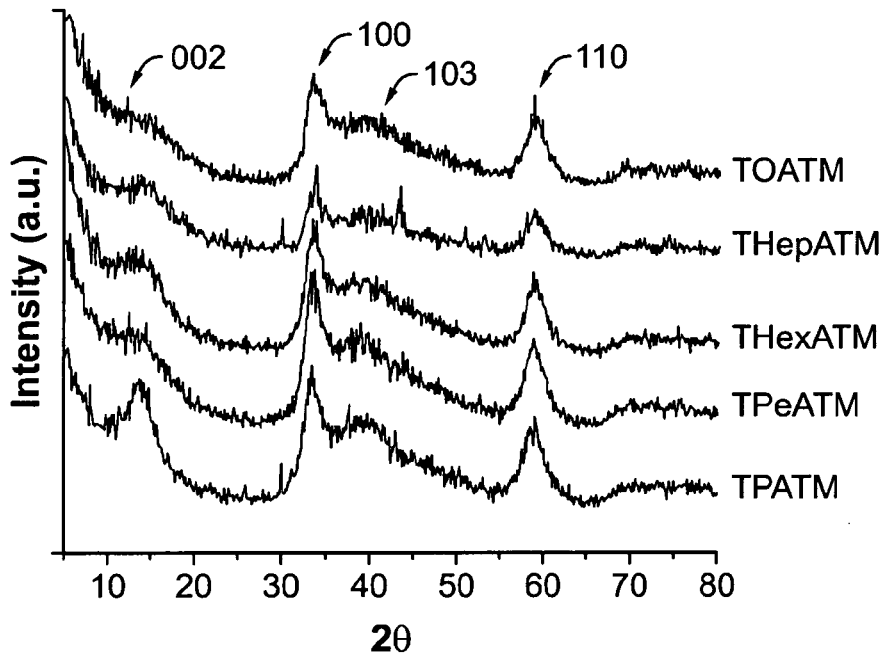

In yet another method, Alonso et al. (1998c; 1998d) and Chianelli et al. (1999) have reported that ammonium thiomolybdate precursors can be decomposed in-situ into high activity and high surface area $MoS_2$ and $WS_2$ catalysts. One interesting feature of this process is the simultaneous catalyst synthesis and catalyst activity measurement. FIG. 3 shows the in-situ process, schematically. X-ray diffraction (XRD) studies describe poorly crystalline structure for $MoS_2$ catalysts produced in-situ from ammonium thiomolybdate precursors. The XRD patterns shown in FIG. 4 are for $MoS_2$ catalysts produced in-situ from various ammonium thiomolybdate precursors.

Figure 5:
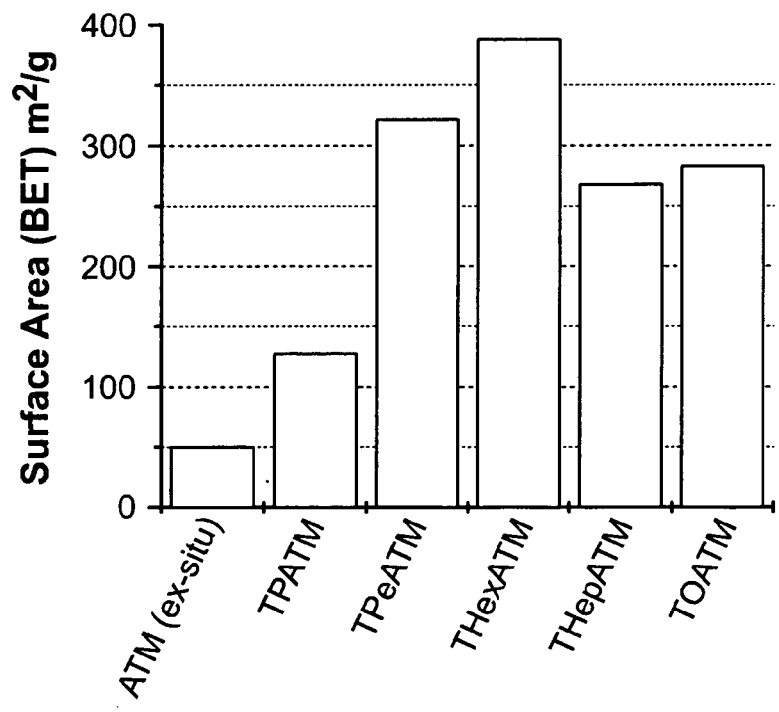
Figure 6:
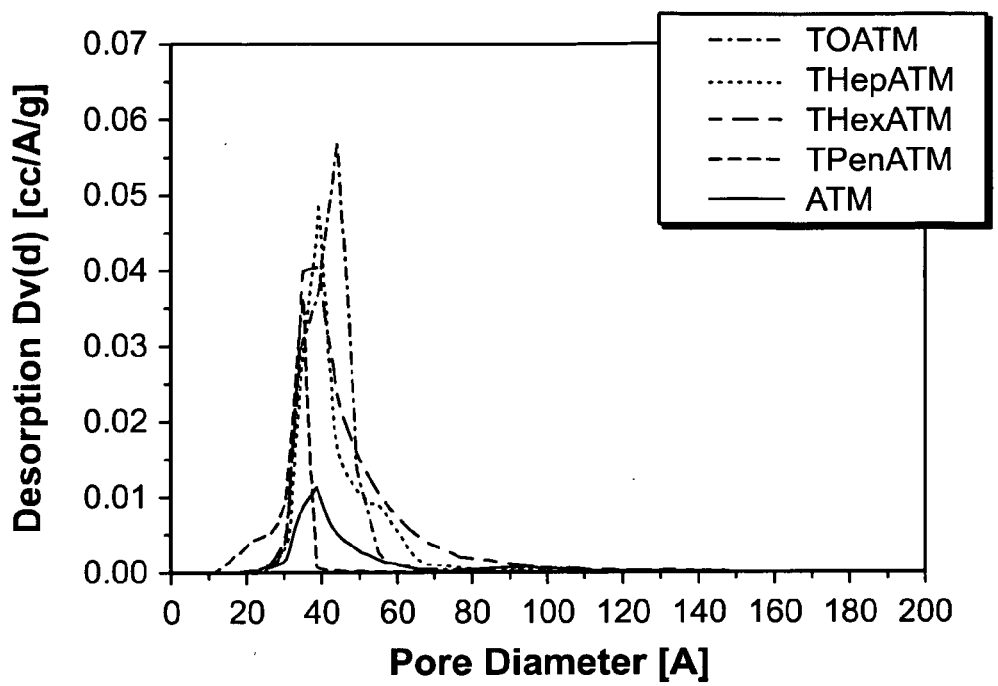
Figure 7:
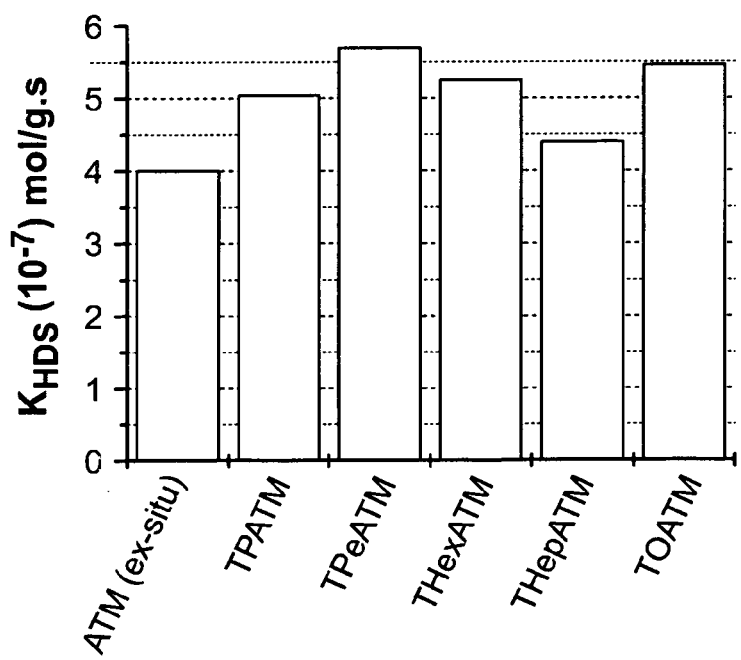

Large variations in surface area have been observed for $MoS_2$ and $WS_2$ catalysts, from a few square meters to several hundred square meters, depending on the condition of decomposition Brownlee 1965; Prasad el al., 1973). In the case of in-situ decomposition of ammonium thiomolybdate precursors, the surface area and activity results have proven to be almost directly proportional (Alonso et al., 2001a). FIGS. 5–7 show these results schematically. Among them, the TPenATM precursor showed the best overall results both in surface area and activity, as well as pore size distribution. As it is evident in FIG. 6, the narrowest pore size distribution belongs to TPenATM.

Cobalt-promoted unsupported catalysts prepared from decomposition of thiosalts have shown higher catalytic activities than catalysts prepared by other means (Vrinat et al., 1984).

H. Hot Isostatic Pressing Technique and its Applications

The hot isostatic pressing (HIP) process was originally developed (U.S. Pat. No. 687,842) for diffusion bonding of nuclear reactor components and for the removal of porosity in hard materials. However, the major commercial activity now centers upon the consolidation of metal powders and on the densification of high-performance castings. It has been used for upgrading castings, densifying presintered components, consolidating powders, and interfacial bonding. It involves the simultaneous application of a high pressure and elevated temperature in a specially constructed vessel. The pressure is applied with a gas (usually inert) and, so, is isostatic. Under these conditions of heat and pressure, internal pores or defects within a solid body collapse and diffusion bond. Encapsulated powder and sintered components alike are densified to give improved mechanical properties and a reduction in the scatter band of properties.

Internal pores or defects within a solid body may originate from, for example, the packing of powder particles, from gas evolution or shrinkage during the solidification of castings, from the agglomeration of vacancies generated by creep, and by interdiffusion during the bonding of dissimilar materials. The driving force to achieve densification is associated with the reduction in surface area and, hence, surface energy of the pores. The isostatic pressure in HIP arises from molecules or atoms of gas colliding with the surface of the object. Each gas atom is acting as an individual "hot forge." Under processing conditions, the gas atoms may be moving at a velocity of around 900 m/s, and approximately 30 collision events are occurring per square meter per second. These tiny atomic forges reach all surfaces of the component, including re-entrant angles, and act reliably and consistently, independent of shape. On average, the number of gas atoms moving through a unit area, and their velocities, are the same in all directions. Thus, for every surface of a component that is being processed, the pressure is the same and acts in a direction normal to the surface (Atkinson et al., 2000).

In the industrial processes using HIP, heating normally precedes pressurization, and the gradual increase in pressure at high temperature leads to simultaneous yielding of the material and densification. A typical HIP pressure of 100 MPa (approximately 1000 atm) is roughly equivalent to the pressure at the bottom of the ocean's deepest trench. The temperatures for HIP are usually greater than 0.7 of the melting point of the material involved. The relatively high temperatures during HIP are necessary to lower the yield strength and to raise the diffusivities in the material sufficiently for pore closure to occur in a reasonable time. Considerable engineering demands are placed on hot-isostatic-press processing equipment by the combination of elevated temperature, high pressure, and time.

Figure 8:
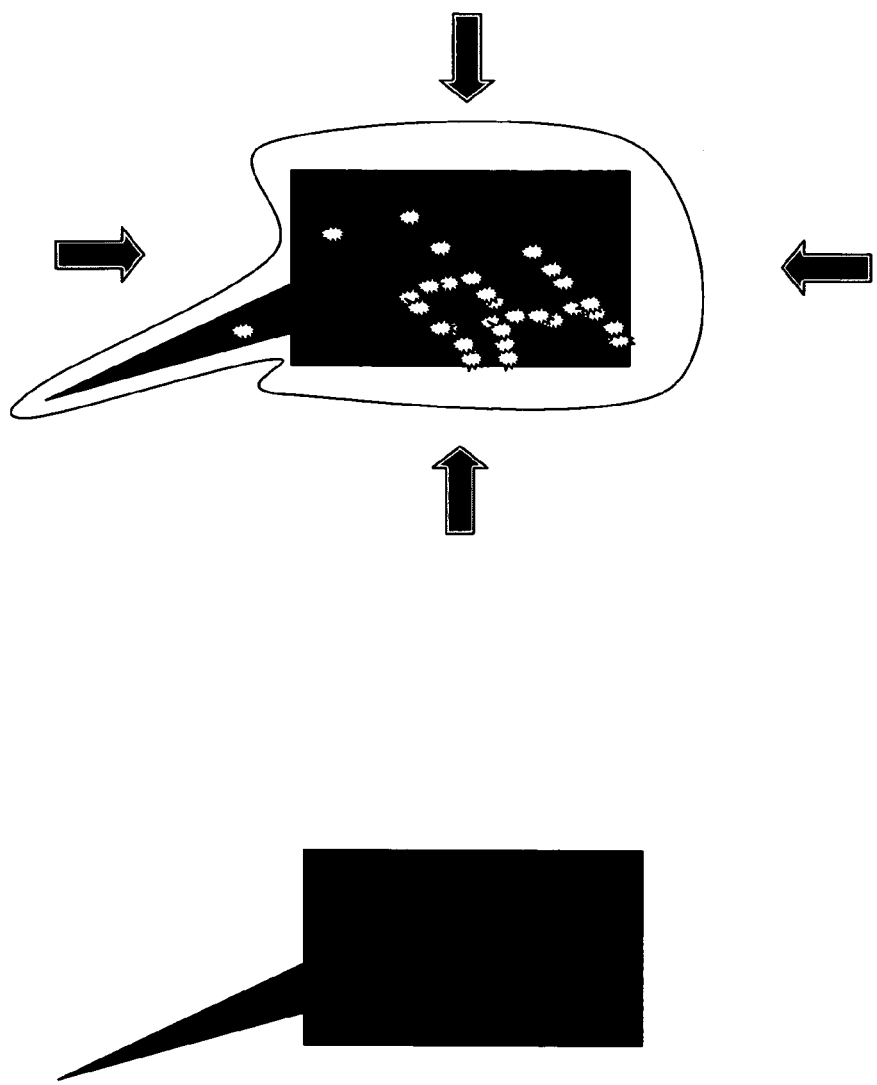

When consolidating a powder (or a pre-shaped high-performance castings) to develop a specified shape and size, the powder is first placed into a can or envelope of the same shape as that specified, but of a larger overall size (FIG. 8). The envelope must be made from a material, such as metal or glass, which can deform in a plastic manner at the temperature and pressure of the appropriate HIP treatment. As densification occurs, the powder compact shrinks. The external metal or glass envelope shrinks with it to the same extent in all directions because the pressure is isostatic. Hence, the densifying powder is formed into the same shape as the envelope. Essentially, the envelope and powder undergo a photographic reduction in shape.

HIP can remove both macro- and microporosity. Microporosity develops in castings owing to shrinkage effects and gas evolution as the molten metal cools and becomes solid. The static and dynamic mechanical properties of castings (e.g., strength, creep, toughness, and fatigue) are adversely affected by the presence of microporosity. Traditionally, casting pores have been removed by hot working, e.g., by forging, but this adds to the cost and changes the shape. On the other hand HIP can be used to remove porosity without adversely affecting the microstructure (i.e., grain structure, phases present, and precipitate arrangement) both for improving reliability in service and for reducing scrap rates during manufacture. Indeed, HIP can influence the microstructure beneficially (Wasielewski et al., 1972). The properties after HIP can be comparable with those of forged components.

HIP not only improves average mechanical properties but also can have an important benefit in reducing the property scatter (Waldron et al., 1978; Quaranta et al., 1981). When a number of specimens are tested, a range of values may be obtained, scattered about the average. After HIP, the average is improved and, perhaps more importantly, the width of the distribution is decreased. This is particularly important where fatigue and creep lives must be predicted as accurately as possible, so as to schedule maintenance accordingly. In addition, the enhancement in minimum property levels due to HIP provides the means by which the designer can work confidently with higher design values.

Isostatic pressing must be distinguished from the more conventional unidirectional pressing. In unidirectional pressing, the pressure is applied along a single axis by a ram, and the component is contained in a die. No intervening fluid is used to transmit the pressure; rather, it is transmitted by contact between the solid surfaces of the ram and the die and the component under pressure. Since friction exists between the object and the die walls, this contributes to a variation in pressure with position in the compact and, hence, to non-uniform densification. There are no such problems with isostatic pressing. In isostatic pressing, there are no rams, dies, or external frictional forces.

A uniform photographic reduction in shape cannot easily be achieved with unidirectional pressing of powders, nor can unidirectional pressing fully remove internal voids from preformed components. In contrast, total void removal can be achieved by HIP, and it is the isostatic nature of the pressure that allows preformed complex shapes such as those of turbine discs to be maintained during the process. Consequently, it is because of these unique advantages that HIP has been and will continue to be utilized in a wide range of industries, including but not limited to aerospace, marine and offshore, power generation, automotive, medical, defense, microelectronics, telecommunications, and metalworking.

I. Hot Isostatic Pressing in Sol-Gel Synthesis

A survey of the available literature indicates that HIP has been used in the sol-gel synthesis of $SiO_2$ but for a completely different purpose and at much lower temperatures and pressures compared to the conventional applications of HIP mentioned in section H. The conventional method of producing an aerogel (Kistler 1931) involves removal of the solvent from a 'wet gel' under supercritical condition, which requires an autoclave. This technique referred to as critical point drying (CPD) uses the autoclave to avoid the build up of tensile stresses that cause the polymeric network to collapse as the vapor-liquid interface recedes into the gel. However, a discovery (U.S. Pat. No. 5,565,142) brought an end to the use of autoclave for the drying process. The discovery involves washing the wet gel with an aprotic solvent (typically heptane) followed by reacting it with trimethylchlorosilane (TMCS) and finally ambient pressure drying (APD). This treatment minimizes shrinkage of the gel through a reduction in the surface tension of the solvent and the contact angle between the solvent and the surface of the silica network (Smith et al., 1995). As such, the use of autoclave providing simultaneous heat and isostatic pressure in the sol-gel technology is becoming obsolete (Land et al., 2001).

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

The tested, produced catalyst showed excellent catalytic activity and selectivity. In one example of producing a $MoS_2$ sieve material of the present invention, the following steps were performed. 6.5 grams of TPenATM was placed inside a flow reactor. While at room temperature, the reactor was pressurized to 500 psi with hydrogen gas. A constant and steady flow of hydrogen gas (1 ml/min) was maintained throughout the entire synthesis process. The reactor temperature was raised to 300° C. at a rate of 2° C./min to allow sufficient time for the evacuation of the organic components. The reactor temperature was kept at 300° C. for one hour to allow complete synthesis to take place. Finally, the reactor was depressurized to one atmosphere followed by furnace cooling.

Materials and Characterization

The reactants (Pen)$_4$NBr of 99% purity and cobalt chloride were purchased from Aldrich. The ATM compound was prepared following methods reported elsewhere (Kruss 1884; Corleis 1886).

Differential thermal analysis (DTA) and thermogravimetric analysis (TGA) of the precursors were performed on a TA Instrument SDT 2960 Simultaneous DTA-TGA, under dry nitrogen flow, from 293 to 1073 K and heating rate of 10 K/min. Characterization of the catalysts was performed on samples obtained after the catalytic tests. The samples were separated from the reaction mixture by filtration, washed with isopropanol to remove residual hydrocarbons and dried at room temperature before analysis.

Specific surface area determination was done with a Quantachrome model AUTOSORB-1, by nitrogen adsorption at 77 K using the BET isotherm. Samples were degassed under flowing argon at 473 K for 2 h. before nitrogen adsorption.

The X-ray diffraction studies were carried out in a Phillips X Pert MPD diffractometer, equipped with a curved graphite monochrometer, using Cu K$_\alpha$ radiation. The scanning electron microscopy (SEM) and energy dispersive spectroscopy (EDS) studies were done with a Jeol JSM5800 IV scanning electron microscope.

Precursor Synthesis

A high-yield method for the easy preparation of [(Pen)$_4$N]$_2$MoS$_4$, is described (Alonso et al., 2001b). This preparation involves the reaction in aqueous solution of (NH$_4$)$_2$MOS$_4$ with stoichiometric amounts of ammonium salt (Pen)$_4$NBr. The reaction involves cation interchange between tetraalkylammonium salt and ammonium, while the water acts as an electrolyte for the reaction. The general relation illustrating the ionic exchange for this process is shown in reaction (1):

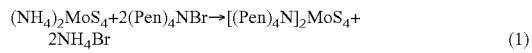

$$(NH_4)_2MoS_4 + 2(Pen)_4NBr \rightarrow [(Pen)_4N]_2MoS_4 + 2NH_4Br \qquad (1)$$

Synthesis of [(Pen)$_4$N]$_2$MoS$_4$ (TPenATM)

Ammonium thiomolybdate (NH$_4$)$_2$MoS$_4$ (2.0 g, 7.7 mmol) was dissolved in 20 ml of water. This solution was added to a solution of tetrapentylammonium bromide (Pen)$_4$NBr (5.8 g, 15.4 mmol) in water (100 ml) at 323 K. The resulting solution was stirred at this temperature for 10 minutes and then kept undisturbed overnight, at room temperature, precipitating red crystals of TPenATM. Synthesis and characterization of this precursor has been reported elsewhere (Alonso et al., 2001b). With this process, any of the alkyl-group precursors may be synthesized (Alonso et al., 2001c). This process is schematically shown in FIG. 1.

Synthesis of Co/[(Pen)$_4$N]$_2$MoS$_4$ (Co/TPenATM)

Three aqueous solutions were prepared and mixed together. Cobalt chloride (0.3 g) was dissolved in 10 ml of water, ammonium thiomolybdate (0.6 g) was dissolved in 30 ml of water, and (Pen)$_4$NBr (1.48 g). was dissolved in 20 ml of water. The cobalt chloride solution was added to the ATM solution, it turned black and thickened. Then the (Pen)$_4$NBr solution was added to this solution. The particles/precipitates formed at the bottom was filtered and is referred to here as Co/TPenATM.

Catalyst Synthesis Using HIP

An open-flow hot isostatic pressing (HIP) technique was applied for synthesizing the catalytic materials. The equipment used was a Carberry-type autoclave, and the gas used as pressure medium was hydrogen to provide a reducing environment, as well. First the desired isostatic pressure is applied to the starting material/catalyst precursor, and then the heat is applied. Under this condition, as the organic components gradually decompose and leave the material, the voids left behind are immediately filled/replaced by the gas (pressure medium) in flow. This substitution warrants the preservation as well as the uniformity of the voids/pores.

The entire process takes place under the flow of H$_2$ gas that is used as medium to develop the isostatic pressure. Consequently, the entire process, as well as the final product synthesized, is devoid of any undesirable residues.

Catalytic Activity and Selectivity

The HDS of dibenzothiophene (DBT) that has been extensively studied as a model of hydrodesulfurization of petroleum feedstock was carried out in a Parr model 4522 high-pressure batch reactor. Approximately one gram of MoS$_2$ catalyst, along with a reagent (5 vol % of DBT in decalin), was placed in the reactor, then pressurized to 3.1 MPa with hydrogen, and heated to 623 K at a rate of 10 K/min. After the working temperature was reached, sampling for chromatographic analysis was performed during the course of each run to determine conversion versus time dependence. Reaction runs averaged about 5 h. The reaction products were analyzed using a Perkin Elmer model Autosystem chromatograph with a 6 ft long, ⅛ inch packed column containing OV-3 as separating phase.

There are three main products from the HDS reaction of DBT. They are biphenyl (BIP), phenylcyclohexane (PCH), and dicyclohexane (DCH). Selectivity for a given product was calculated as the weight percentage of the product in the product mixture.

Thermal Analysis

Thermogravimetric and differential thermal analyses (TGA-DTA) of the precursors were performed to study the fragmentation of their molecular structures and to determinate their decomposition behavior. The resulting TGA-DTA curves for tetrapentylammonium thiomolybdate were compared to the previous studies made by Alonso et al. (1998c; 1998d) and Brito et al. (1995). In this work, the fragmentation of the chemical structure is proposed with respect to the experimental results by thermogravimetric analysis. The fragmentation occurs principally between the sulfur-nitrogen and nitrogen-carbon bonds.

According to the thermogravimetric data reported in Table 1, the thermal decomposition of tetrapentylammonium thiomolybdate in nitrogen follows a different pattern to that reported previously (Alonso et al., 1998d; Brito et al., 1995) for ATM and ATT. In fact, the most notable difference is the absence of the exothermic peak corresponding to the trisulfide-disulfide transition. In thermal decomposition of ATM and/or ATT, the NH$_3$ and H$_2$S are first eliminated at 423–491 K to form MoS$_3$. The second decomposition step is notably exothermic and is characterized by the simultaneous reduction of Mo(VI) to Mo(IV) while, S$^{2-}$ is oxidized to S$^O$ at 676 K. It is, however, important to note that the final composition of MoS$_2$ depends on the type of atmosphere during the thermal decomposition of the thiosalts. Indeed, Brito et al. (1995) showed that in hydrogen atmosphere the decomposition of ATM yields MoS$_{2-x}$, whereas in air atmosphere MoS$_2$O was observed.

The transitions as well as weight losses are consistent with the reactions (2) and (3):

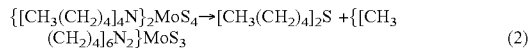
(2)

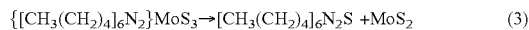
(3)

Reaction (2) shows elimination of dipentyl sulfide [$CH_3(CH_2)_4]_2S$ at 403 K. Reaction (3) suggests complete elimination of [$CH_3(CH_2)_4]_6N_2S$ at 623 K. This complicated decomposition pattern may involve intramolecular rearrangement and interaction with neighboring units of TPenATM. Accordingly, the final product of the thermal decomposition corresponds to nearly stoichiometric $MoS_2$.

The decomposition (Iwata et al., 1998; Fuentes et al., 1988; Inamura et al., 1994) of thiosalts from ATM or ATT under 15% $H_2S/H_2$ at 350–400° C. is an effective method for preparing unsupported or alumina-supported $MoS_2$ and $WS_2$ catalysts. These as-synthesized catalysts are highly active in hydrotreating processes such as hydrogenation, hydrodesulfurization and hydrodenitrogenation (Zhang et al., 1995; Vasudevan et al., 1994; Ramanathan et al., 1985).

TABLE 1

DTA-TGA results for the TPenATM precursor in nitrogen atmosphere

| | TPenATM |
|---|---|
| $T_1$ (K) | 403 |
| $\Delta w_{exp}$, % wt loss | 21.6 |
| $\Delta w_{theor}$, % wt loss | 21.3 |
| Assuming loss of: | [Pentyl]$_2$S (2) |
| $T_2$ (K) | 623 |
| $\Delta w_{exp}$, % wt loss | 60.4 |
| $\Delta w_{theor}$, % wt loss | 59.5 |
| Assuming loss of: | [Pentyl]$_6$N$_2$S (3) |
| $\Sigma\Delta w_{exp}$, % wt loss | 82.0 |
| (Final product)$_{exp}$, % wt remaining | 18.4 |
| (Final product)$_{theor}$, % wt remaining | 19.2 |
| Assuming final product $MoS_2$ | |

The following examples present results obtained on unsupported $MoS_2$ catalyst/material synthesized under different conditions of temperature and pressure using the open-flow HIP method.

Example 2

X-Ray Diffraction

Figure 9:
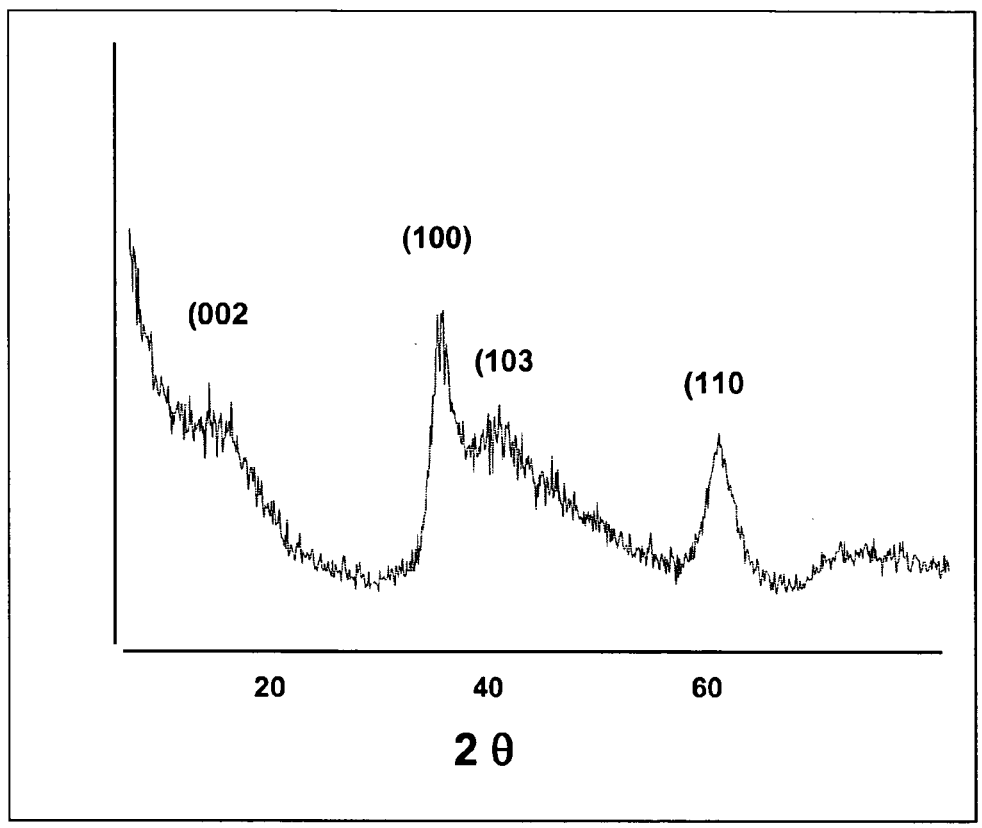
FIG. 9. XRD pattern of HIP-assisted $MoS_2$ obtained from TPenATM. This pattern is indeed in agreement with those reported for poorly crystalline $MoS_2$ structure (Alonso et al., 2001; Alonso et al., 1998). Compare with FIG. 4.

The XRD pattern for $MoS_2$ describes a poorly crystalline structure, as expected. It is important to note that the diffraction profile of poorly crystalline $MoS_2$ is different from that of the crystalline $MoS_2$ (Alonso et al., 1998b; Chianelli, 1982). FIG. 9 describes the XRD pattern of the $MoS_2$ obtained from TPenATM. This pattern is indeed in agreement with those reported for poorly crystalline $MoS_2$ structure (Alonso et al., 2001a; Alonso et al., 1998b). Comparison with FIG. 4 indicates identical results.

Example 3

Scanning Electron Microscopy

Figure 10:
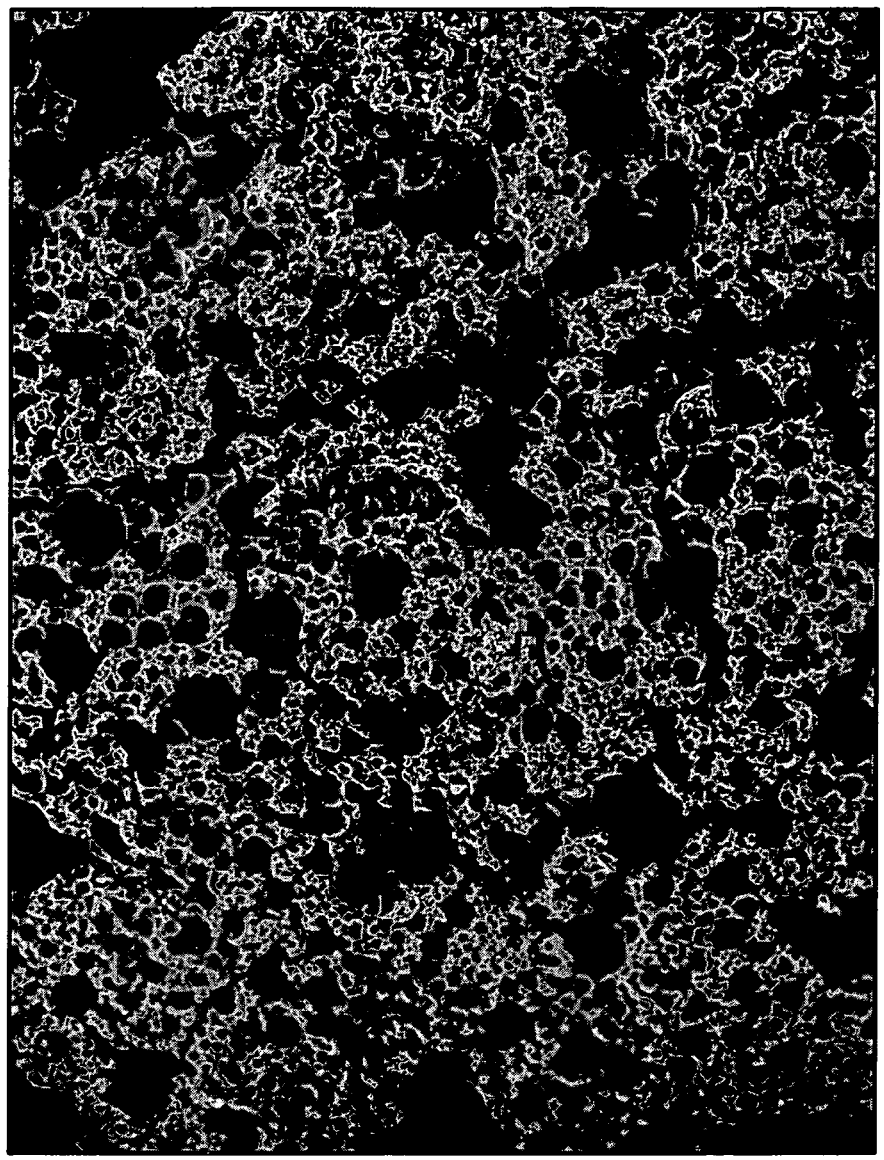
FIG. 10 A low magnification shot of an as synthesized $MoS_2$ from TPenATM.
Figure 11:
FIG. 11 A higher magnification of FIG. 10 showing the fine nature of the surface pores.
Figure 12:
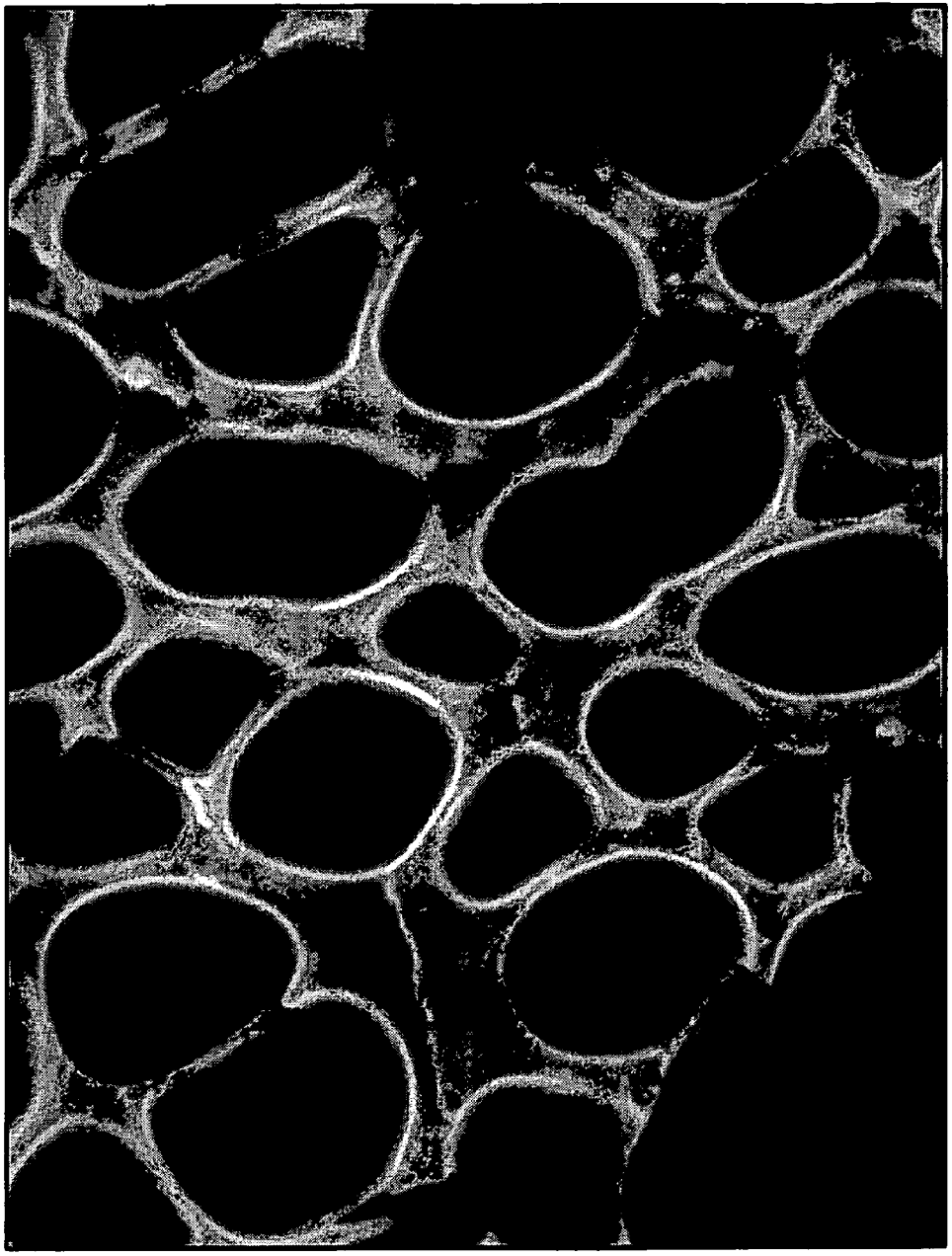
FIG. 12 A high-magnification description of a fresh fracture surface of an as-synthesized $MoS_2$ from TPenATM. The almost uniform nature of the pores as well as the pattern among them is worthy of close observation. The approximately 30 Å mesopores identified by the BET (FIG. 13) are not resolved in these SEM micrographs.
Figure 13:
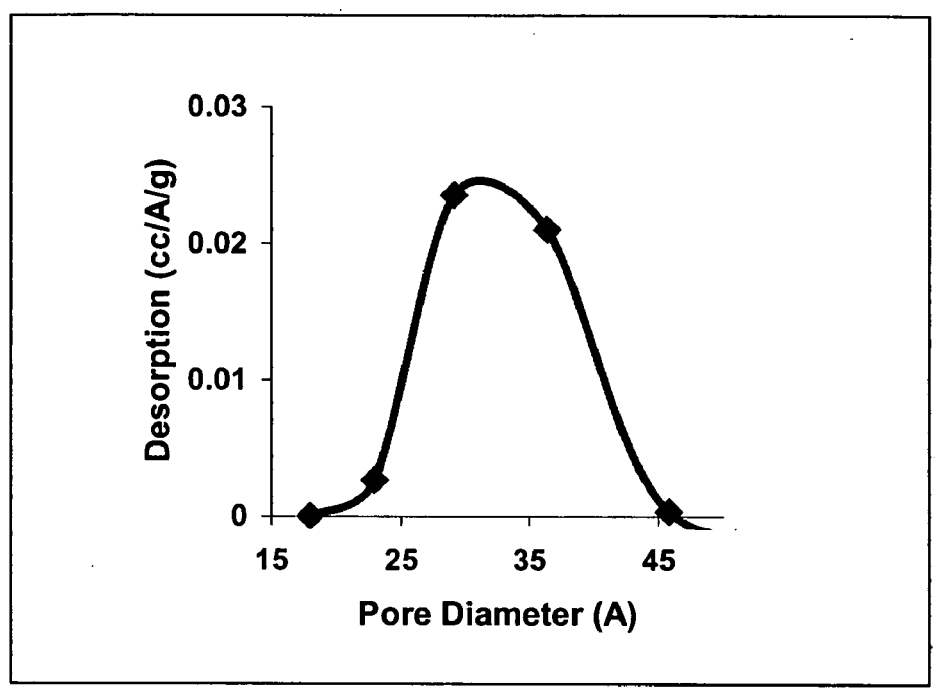
FIG. 13 BET diagram of a HIP-synthesized sample showing average pore size of 30 Å.

The SEM studies on the $MoS_2$ catalysts consistently revealed porous structures. FIG. 10 shows a low magnification shot of an as-synthesized $MoS_2$ from TPenATM. FIG. 11, which is a higher magnification of FIG. 10, shows the fine nature of the surface pores. A high-magnification description of a fresh fracture surface is presented in FIG. 12. The almost uniform nature of the pores as well as the pattern among them is worthy of close observation. It is important to note that the approximately 30 Å mesopores identified by the BET studies (FIG. 13) are not resolved in these SEM micrographs.

Example 4

Catalyst Activity

The catalysts prepared were characterized for activity and selectivity analyses. The two synthesis variables were temperature and pressure. A constant synthesis time span of one hour was used for all experiments. Results indicated that both pressure and temperature impart significant effects on catalyst properties such as reaction rate constant (k) and surface area (BET).

Example 5

Effect of Pressure

Figure 14:
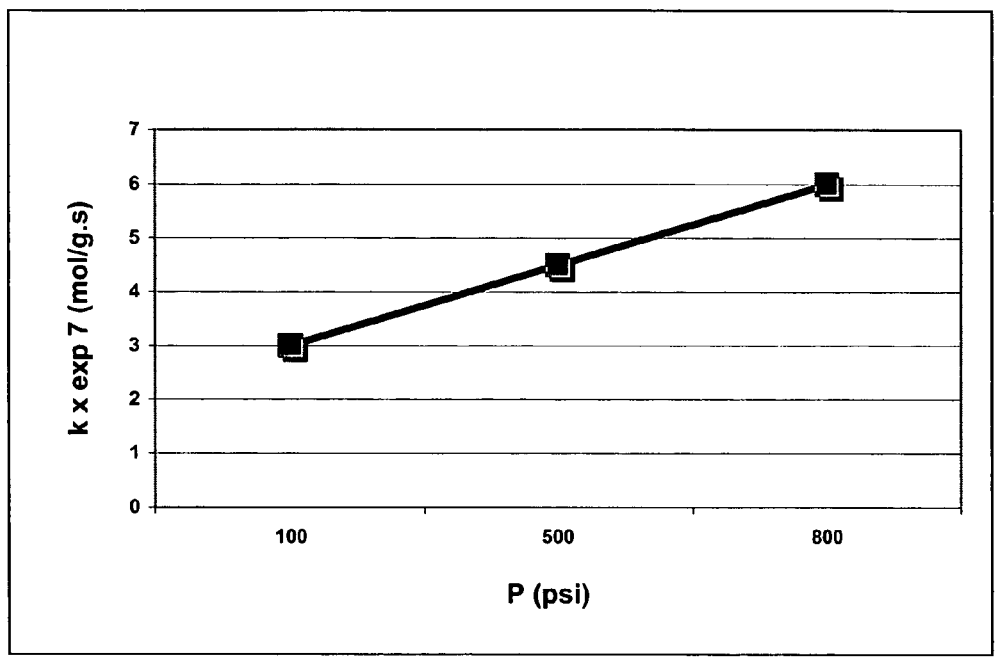
FIG. 14 Effect of pressure on k value of the catalysts synthesized from TPenATM precursor at a constant temperature of 300° C. The increase in pressure from 100 to 800 psi shows a proportional increase in the value of k from 3 to $6 \times 10^{-7}$ mol/g.s, respectively.

The value of reaction rate constant (k) is directly proportional to the effectivity/efficiency of a given catalyst. FIG. 14 shows the effect of pressure on the k value of the catalysts synthesized from TPenATM precursor at a constant temperature of 300° C. The increase in pressure from 100 to 800 psi has shown a proportional increase in the value of k from 3 to $6\times10^{-7}$ mol/g.s, respectively. It is interesting to note that Alonso et al. (2001a) achieved about the same maximum value for k from the same precursor using in-situ catalyst preparation.

Figure 15:
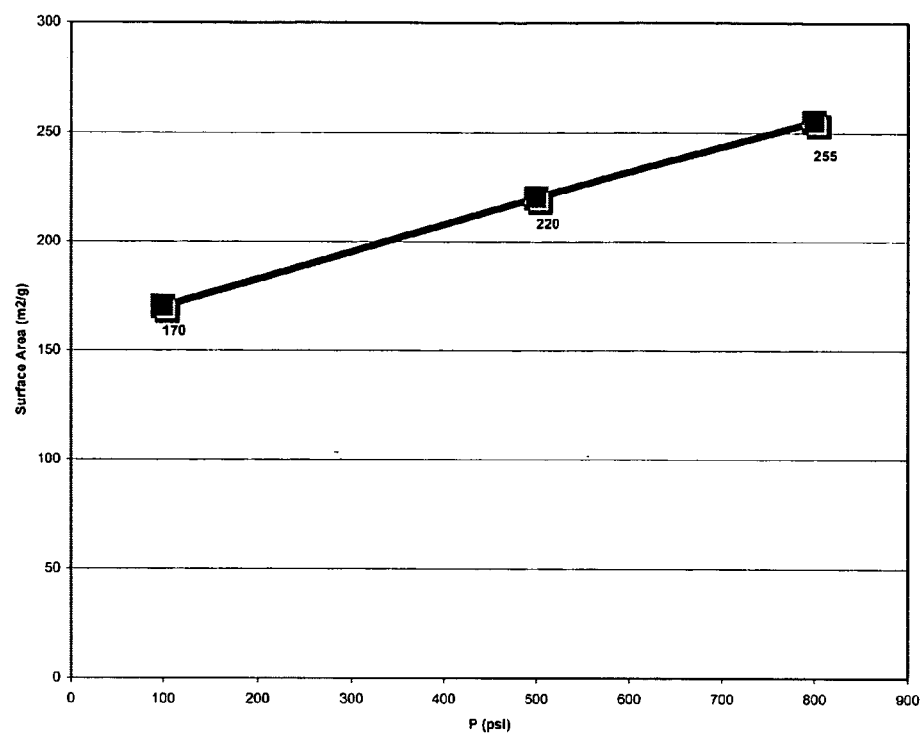
FIG. 15 Catalysts surface areas linearly increase with increase in synthesis pressure.
Figure 16:
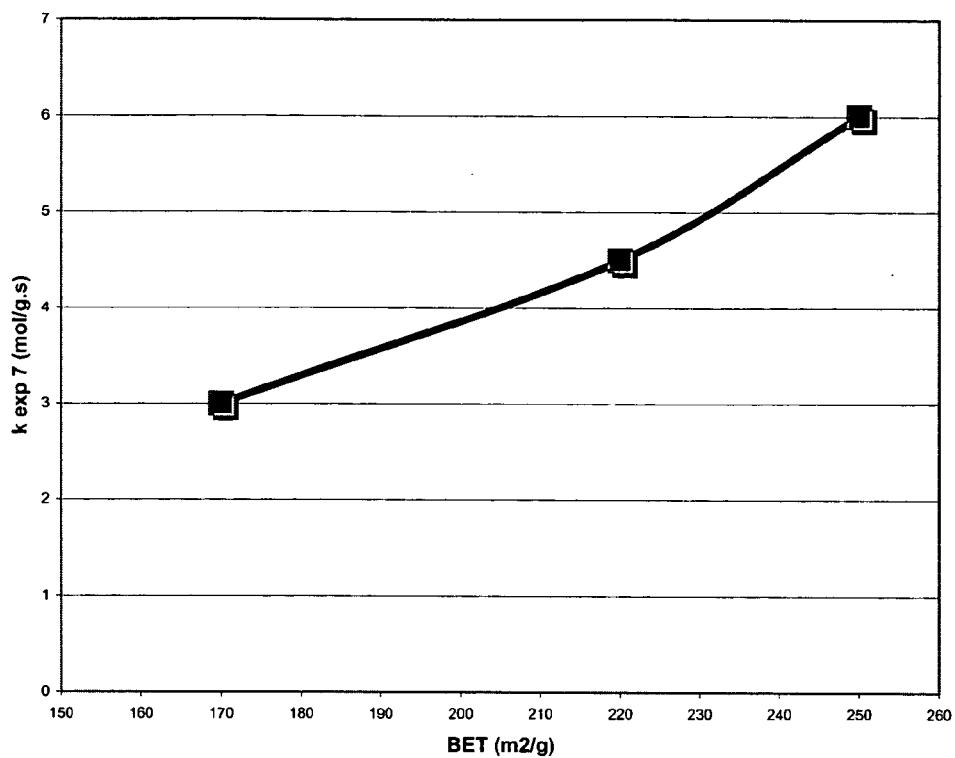
FIG. 16 Linear correlation between surface area and activity. This result conforms to the results achieved by Alonso et al. (2001), i.e., the higher the surface area, the higher the catalytic activity in decomposition of thiosalts.

One other interesting feature observed in this investigation was the identical effect of synthesis pressure on the catalysts surface areas as determined by BET adsorption studies. As illustrated in FIG. 15, catalysts surface areas linearly increased with increases in synthesis pressure. It is also interesting to note the linear correlation between surface area and activity results (FIG. 16). This result conforms to the results achieved by Alonso et al. (2001a), i.e., the higher the surface area, the higher the catalytic activity in decomposition of thiosalts. This conformation occurred despite the use of two different synthesis techniques, i.e., in-situ technique in the case of Alonso et al. (2001a) and HIP technology in this study.

Example 6

Effect of Temperature

Figure 17:
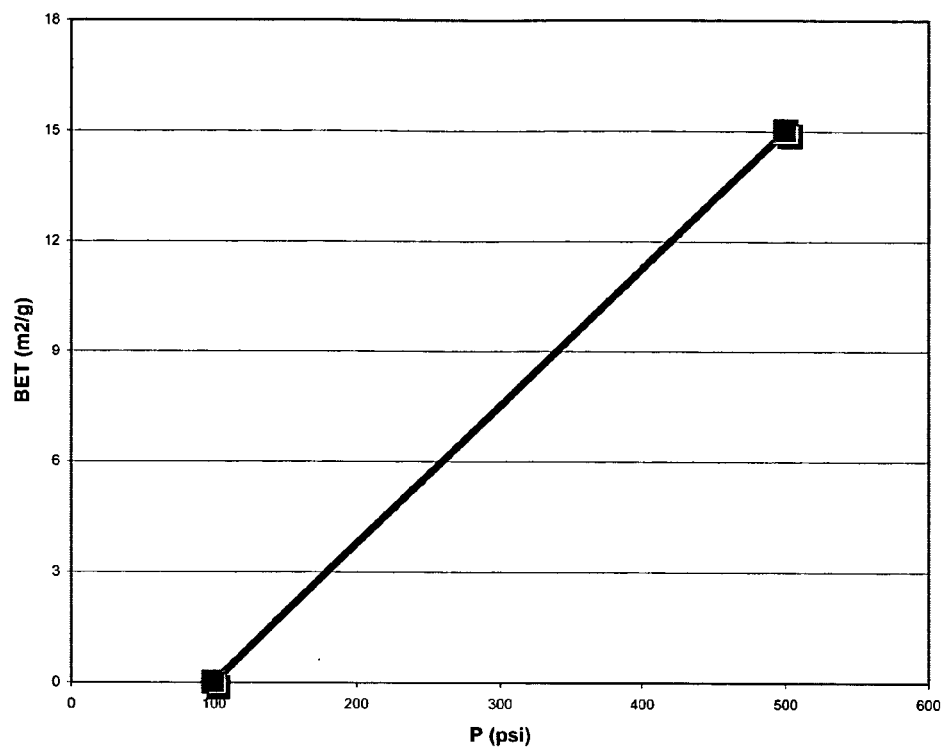
FIG. 17 Two runs conducted at 400° C. but pressures of 100 and 500 psi. Surface areas are very low, zero and 15 m²/g, respectively. $N_2$ gas was used as pressure medium.

Two different temperatures of 300 and 400° C. were used in this study. These two temperature values were chosen because the TGA studies (FIG. 2) have proven that complete decomposition of these thiosalt precursors occurs at around 350° C. In order to magnify the effect of synthesis temperature, 50° C. below and above the 350° C. were tested. Results of two runs conducted at 400° C. but different pressures are shown in FIG. 17. For both synthesis pressures of 100 and 500 psi, the surface areas were very low, zero and 15 m²/g, respectively.

Figure 18:
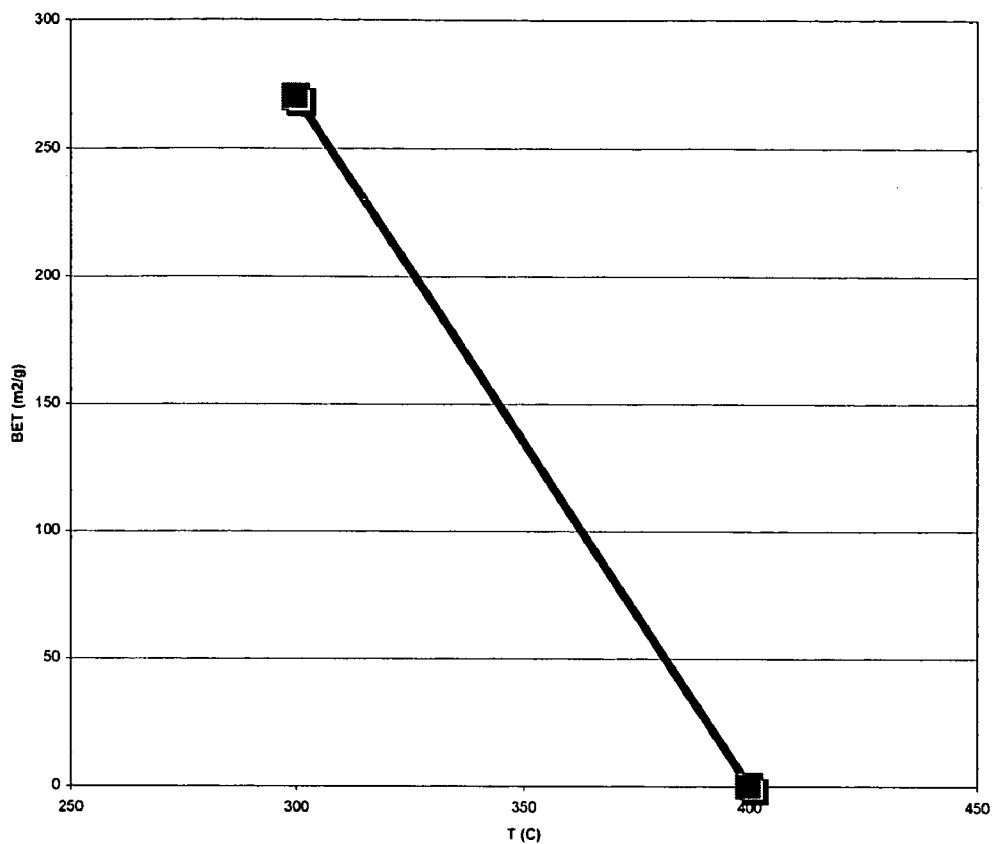
FIG. 18 Constant pressure of 100 psi and two temperatures of 300 and 400° C. BET value drops from nearly 270 m²/g down to zero for the respective synthesis temperatures of 300 and 400° C. The optimal synthesis temperature may be around 300° C. $N_2$ gas was used as pressure medium.

The effect of temperature became much more pronounced when two runs were conducted at a constant pressure of 100 psi but two temperatures of 300 and 400° C. As shown in FIG. 18, the BET value dropped from nearly 270 m²/g down to zero for the respective synthesis temperatures of 300 and 400° C. These experiments indicate that the optimal synthesis temperature may be around 300° C., though temperatures up to 350° C. appear to work

Example 7

Effect of Pressure Medium

Another important point to note regarding the results shown in FIG. 17 and FIG. 18 is that $N_2$ gas was used as pressure medium during HIP-assisted synthesis of these three high surface area samples. In all three cases, however, the k values were below 1 mol/g.s, clearly indicating that $N_2$ is not an appropriate synthesis gas for activity purposes, for it does not provide a reducing environment during synthesis. In other words, high surface-area materials production via HIP is possible irrespective of the synthesis gas, but not high-activity catalysts.

Example 8

Effect of Promoter

Figure 19:
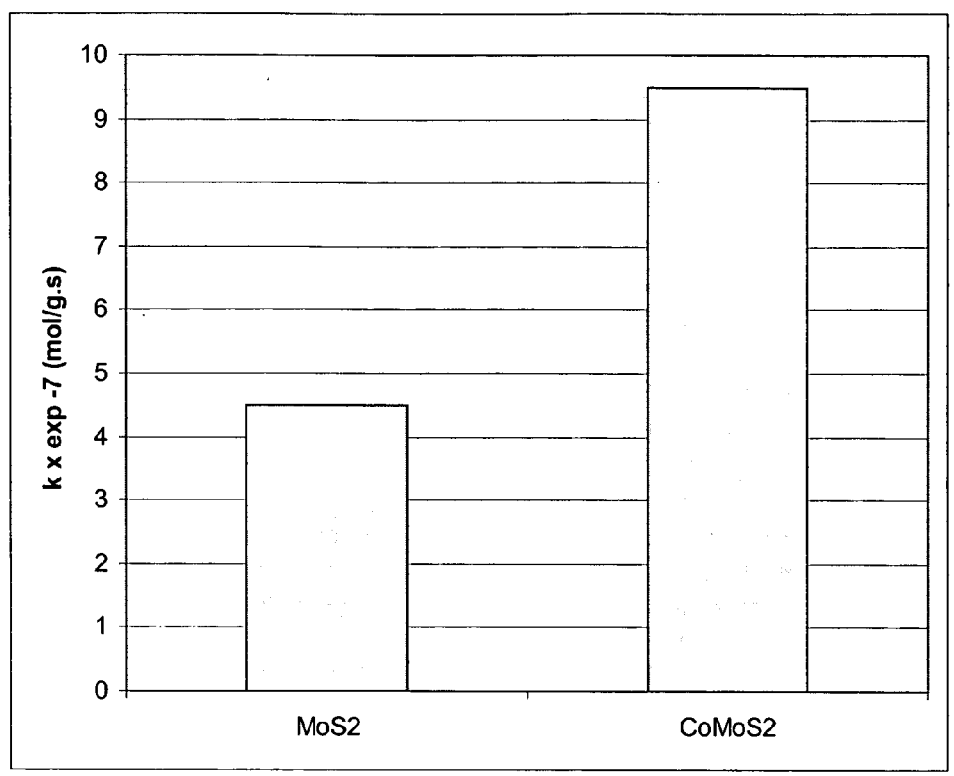
FIG. 19 Two catalysts synthesized under identical HIP conditions (500 psi, 300° C., and 1 h). The k value for the Co-promoted catalyst is more than twice the unpromoted one.

It is known that metal-promoted unsupported catalysts prepared from decomposition of thiosalts show higher catalytic activities than catalysts prepared by other techniques (Vrinat et al., 1984). The increase in catalytic activity for metal-promoted unsupported catalysts may be up to seven fold (Private Communication). Therefore, Co-promoted catalysts were also synthesized and tested. The k values for two catalysts under identical HIP synthesis conditions (500 psi, 300° C., 1 h) are shown in FIG. 19. The k value for the promoted catalyst is more than twice the unpromoted one.

Example 9

Effect of Precursor

Figure 20:
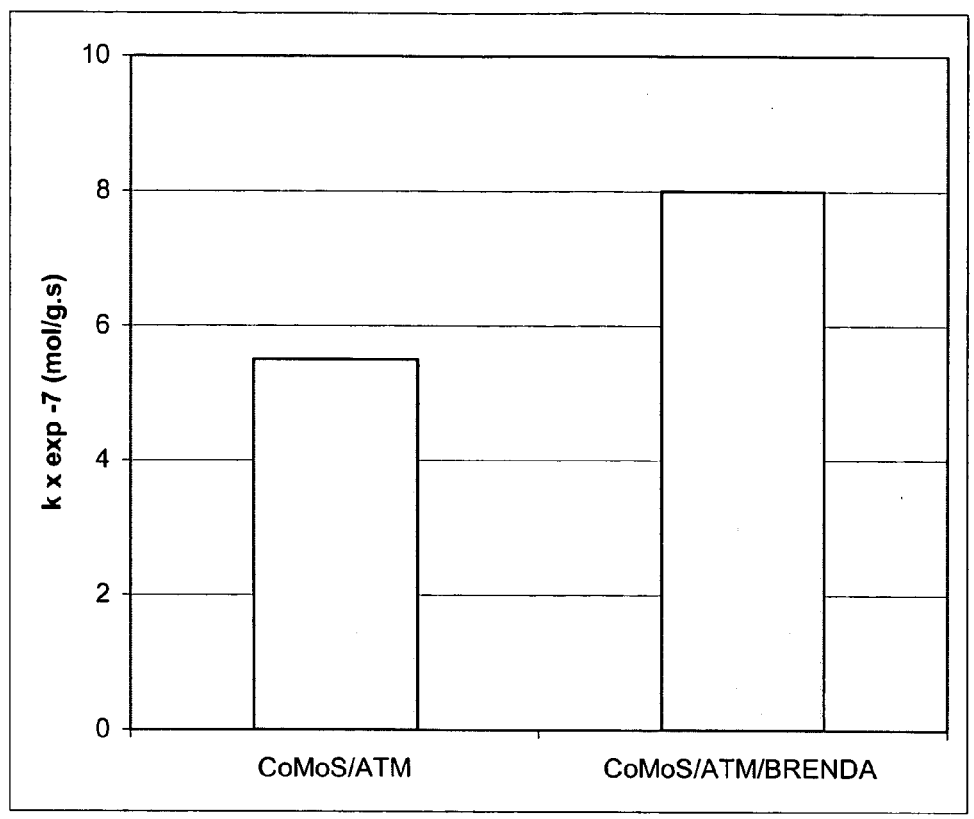
FIG. 20 Co-promoted catalysts prepared from ATM (without Pentyl) under identical HIP synthesis conditions (500 psi, 300° C., and 1 h) but with different precursor preparation methods. Note the BRENDA precursor shows a higher k value.

Two other significant factors in obtaining the best catalyst are the precursor ingredient and preparation method. Promoted catalysts prepared from ATM (without Pentyl) under identical HIP synthesis conditions (500 psi, 300° C., 1 h) but with different precursor preparation conditions yielded different results. This difference is evident in FIG. 20. There was a 50% improvement in the catalyst prepared by the new precursor preparation method. To distinguish, this new method is referred to as BRENDA (Private Communication).

Example 10

HIP vs. Hydrothermal Method

To study the catalystic activity at higher pressures, some samples were run using the hydrothermal method (due to lack of high-pressure open flow HIP equipment). "Hydrothermal technique" is a generic term encompassing such terms as hydrothermal reaction, hydrothermal growth, hydrothermal synthesis, hot isostatic pressing and, hydrothermal hot pressing. Moreover, the common features in the hydrothermal technique are described by the definition: "any heterogeneous chemical reaction in the presence of a solvent (whether aqueous or nonaqueous) above room temperature and at pressure greater than 1 atm in a closed system." From this definition, it is evident that there is "isostatic pressure" acting on the material under investigation at high temperatures in a closed system.

Figure 21:
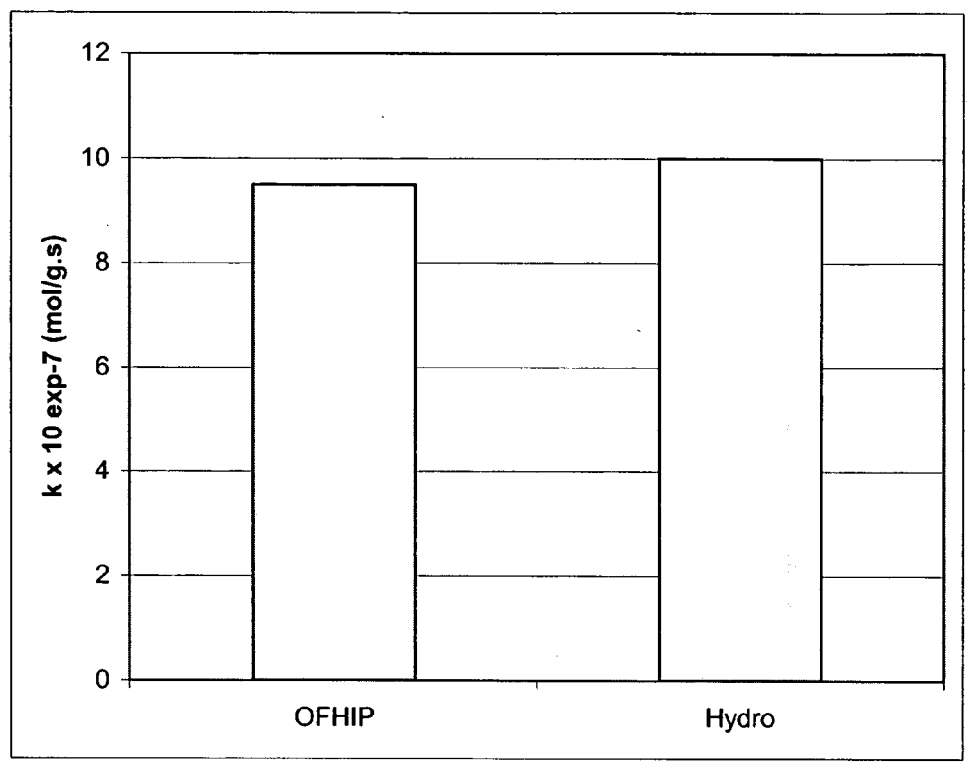
FIG. 21 HIP technique is not a totally closed system. When identical synthesis conditions (500 psi, 300° C. and 1 h) and precursor (Co/TPenATM) were used to test HIP vs. hydrothermal, both techniques rendered almost the same k values.

Since the open flow HIP technique is not a totally closed system, identical synthesis conditions (500 psi, 300° C. and 1 h) and precursor (Co/TPenATM) were used to test HIP vs. the hydrothermal method. As it is evident in FIG. 21, both techniques rendered almost the same k values. Comparison of FIGS. 7 and 14 also indicates about the same k values from the same precursor (TPenATM) between the in-situ and HIP synthesis methods. The in-situ method is indeed the same as the hydrothermal technique. Consequently, the hydrothermal technique was used to synthesize some catalysts at pressures of 1200 and 1400 psi.

Example 11

Effect of Precursor and Pressure

Figure 22:
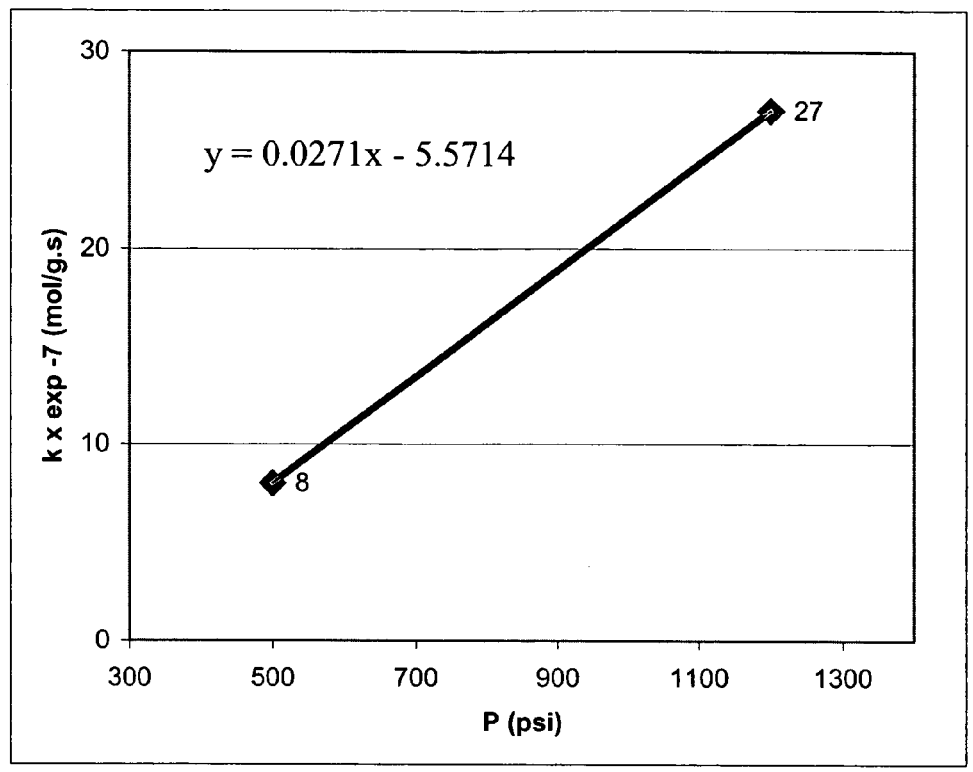
FIG. 22 Promoted catalysts prepared from ATM (without Pentyl). There is over 3 fold enhancement in the k value with pressure increase from 500 psi to 1200 psi. Equation of straight line indicates that the k value would be approximately $50 \times 10^{-7}$ mol/g.s at synthesis pressure of 2000 psi.

Using the BRENDA precursor preparation method and varying the applied pressure has been the key toward fabricating the best catalysts. FIG. 22 highlights the effect of pressure. There was a more than 3-fold enhancement in the k value with pressure increases from 500 psi to 1200 psi. The straight line equation indicates that the k value would be approximately $50 \times 10^{-7}$ mol/g.s at synthesis pressure of 2000 psi. The precursor to these Co-promoted catalysts is ATM (without Pentyl).

Figure 23:
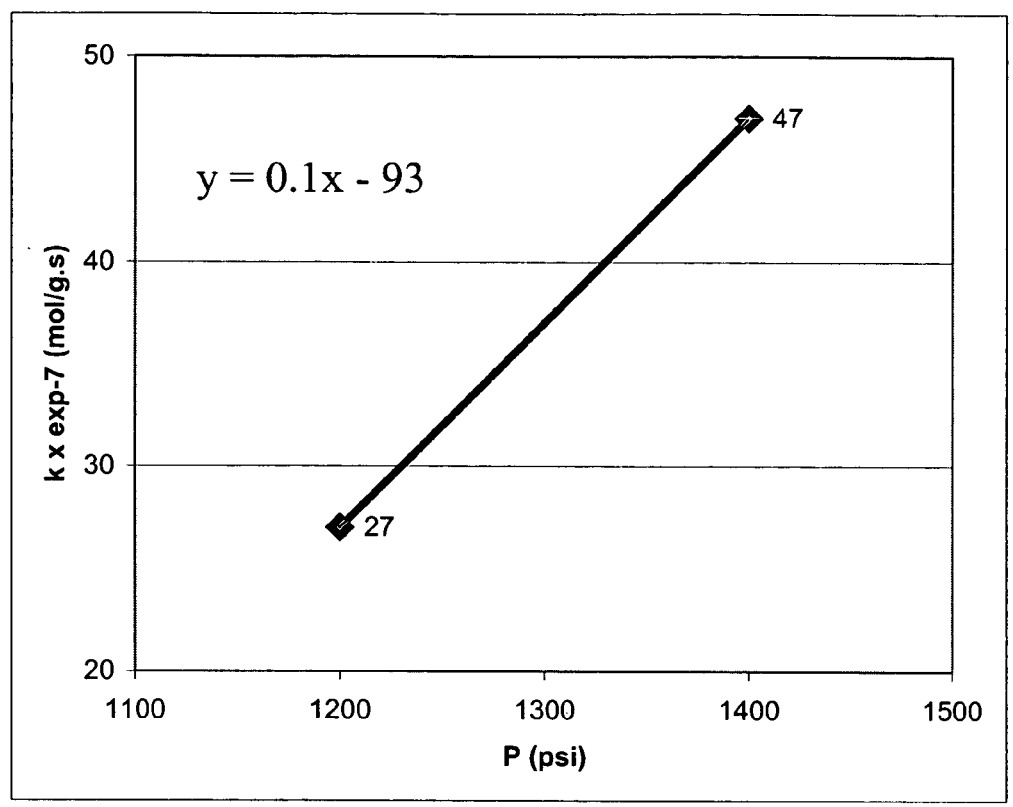
FIG. 23 When the precursor ingredient was changed from ATM to TPenATM, and using the BRENDA preparation, the k value improved another 75%, i.e., from $27 \times 10^{-7}$ for ATM to $47 \times 10^{-7}$ mol/g.s for TPenATM. Synthesis pressure was increased from 1200 psi for ATM to 1400 psi for TPenATM. Equation of straight line predicts that the k value would be approximately $107 \times 10^{-7}$ mol/g.s at synthesis pressure of 2000 psi.

When the precursor ingredient was changed from ATM to TPenATM, and the BRENDA precursor preparation method was used, the k value improved another 75%. FIG. 23 shows this improvement. The k value from $27 \times 10^{-7}$ for ATM increased to $47 \times 10^{-7}$ mol/g.s for TPenATM. In this case, the synthesis pressure was also increased from 1200 psi for the ATM to 1400 psi for the TPenATM. The straight line equation predicts that the k value would be approximately $107 \times 10^{-7}$ mol/g.s at synthesis pressure of 2000 psi.

Figure 24A:
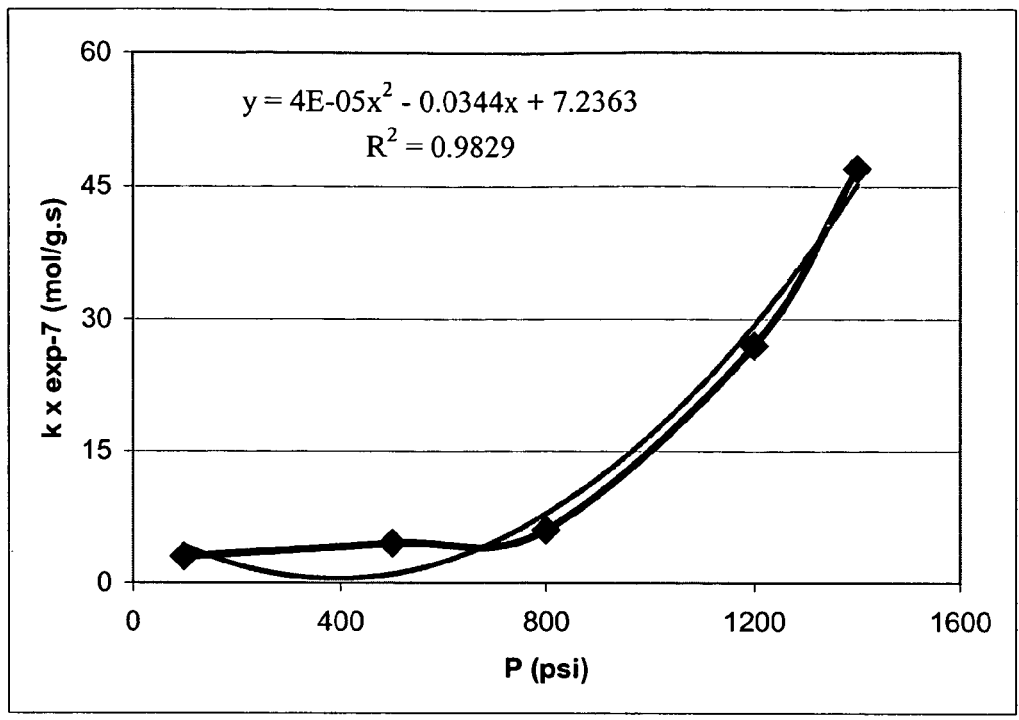
FIG. 24A–B A. Values of k for all pressures tested. Polynomial curve fitting projects a k value of $98 \times 10^{-7}$ mol/g.s at synthesis pressure of 2000 psi. B. Values of k for all pressures tested. Exponential curve fitting projects a k value of $142 \times 10^{-7}$ mol/g.s at synthesis pressure of 2000 psi.
Figure 24B:
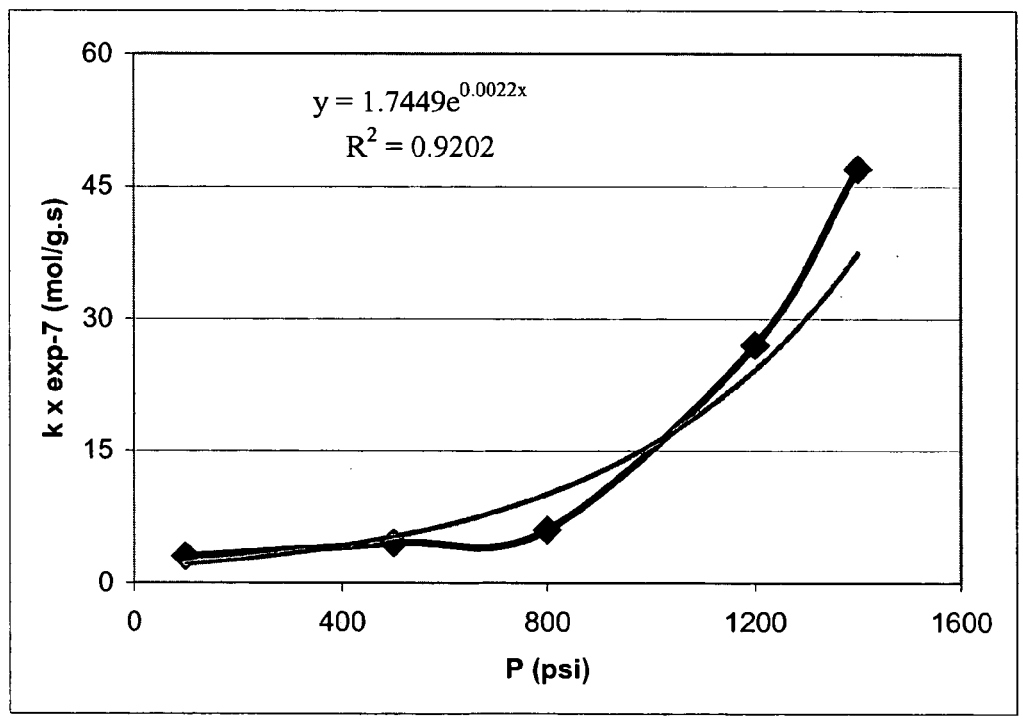

Finally, FIG. 24 shows the k values at all pressures tested. For 2000 psi, polynomial and exponential curve fittings project k values of $98 \times 10^{-7}$ and $142 \times 10^{-7}$ mol/g.s, respectively.

Example 12

Small Angle X-Ray Scattering (SAXS)

Figure 25:
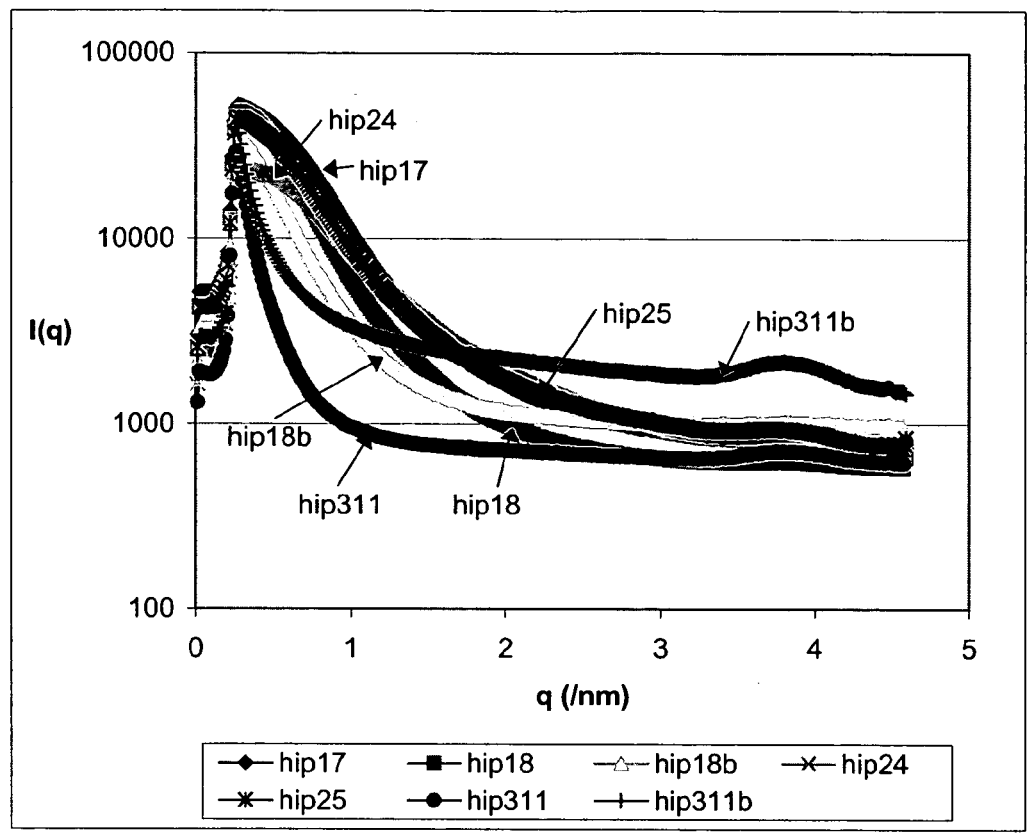
FIG. 25 SAXS diagram for some select samples. This figure shows the q range of 0.001312–0.4592 Å$^{-1}$ corresponding to d range of 4787–14 Å.

Two separate runs collecting different portions of reciprocal space were conducted and the data collected were used to graph intensity I(q) vs. q. FIG. 25 shows I(q) vs. q for some select samples. This figure shows the q range of 0.001312–0.4592 $Å^{-1}$ corresponding to d range of 4787–14 Å. Therefore, features 14 Å and larger may be studied.

Figure 26:
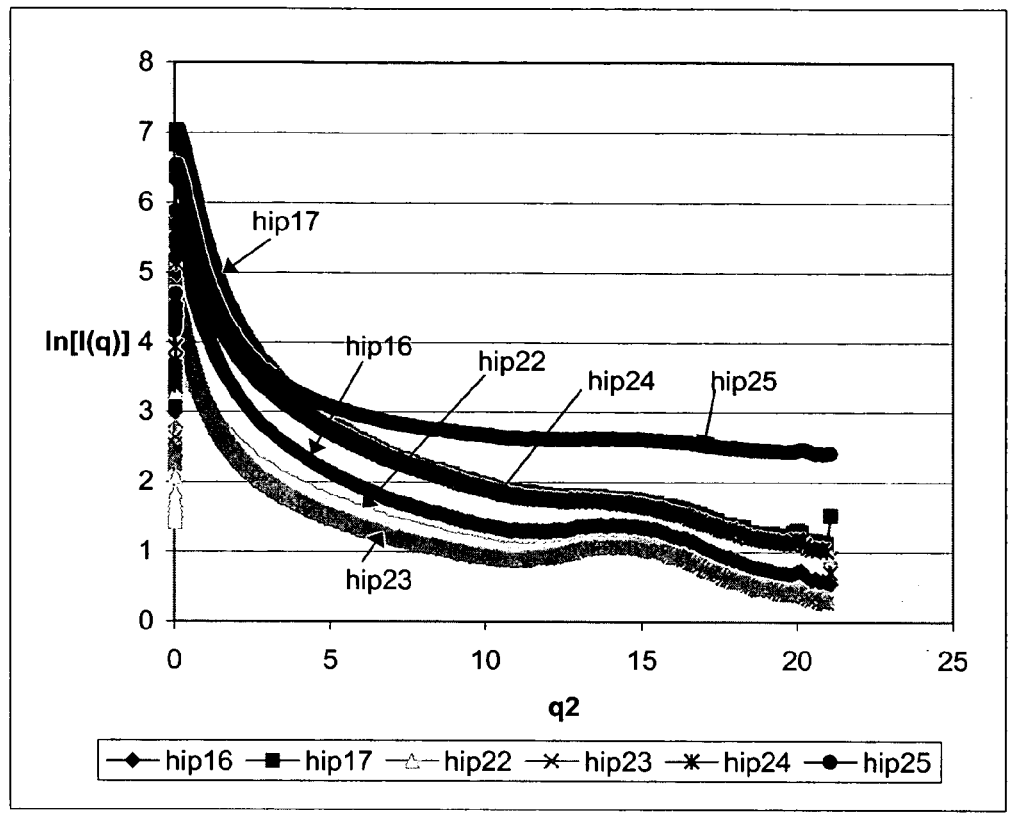
FIG. 26 Based on the Guinier law, the initial slope gives $R_g^2/3$, where $R_g$ is the radius of gyration.
Figure 27:
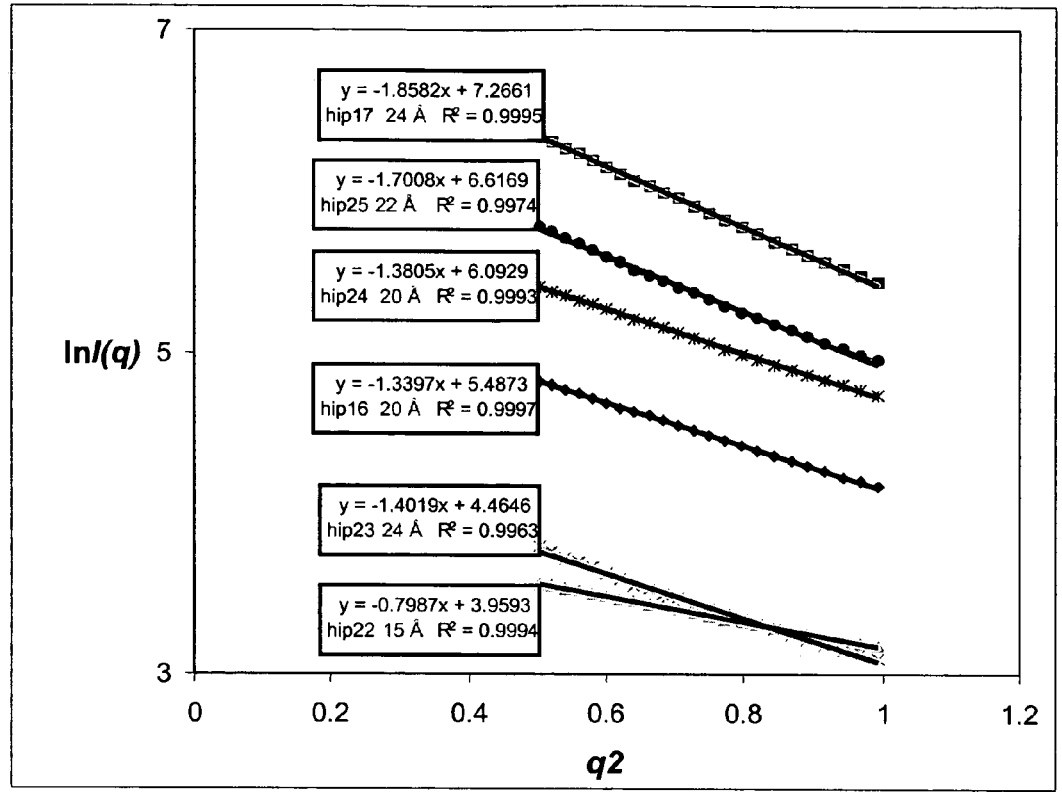
FIG. 27 The initial slopes providing $R_g$, the radius of gyration, for some of the samples. Note that $R_g$ for these samples is around 20 Å.

In FIG. 25, one can observe the intensity decay as a function of q. Based on the Guinier law, when the logarithm of I(q) is plotted against $q^2$ (FIG. 26), the initial slope gives $R_g^2/3$, where $R_g$ is the radius of gyration. FIG. 27 shows the initial slopes for some of the samples. Sample 17, for instance, has a radius of gyration of 24 Å.

Figure 28:
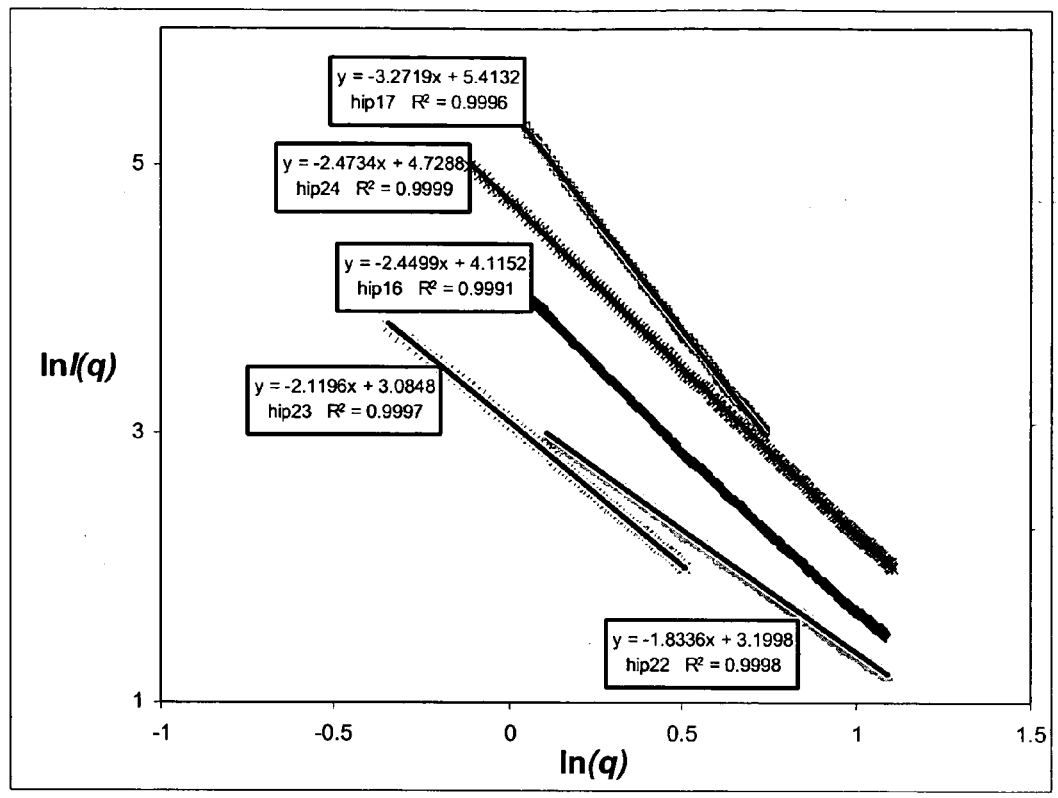
FIG. 28 Based on Porod law, the power-law exponent at large q reflects the shape/fractal nature of the scattering object. This can be obtained by finding the slope for each sample. For instance, sample 17 has a slope of 3.27, indicating that its pores are spherical and surface fractal (rough surface).

Based on Porod law, the power-law exponent at large q reflects the shape/fractal nature of the scattering object. This can be obtained by plotting logarithm of I(q) vs. logarithm of q and finding the slope. FIG. 28 shows the slopes for some of the samples. For instance, sample 17 has a slope of 3.27, indicating that its pores are spherical and surface fractal (rough surface). The various values obtained from the SAXS data for the samples synthesized by HIP are listed in Table 2. The different precursors and processing conditions along with the corresponding activity (k) and surface area values for each sample are also shown in Table 2. It is evident from the Porod values that all unpromoted samples are mass fractals except the two synthesized at 800 psi.

Figure 29:
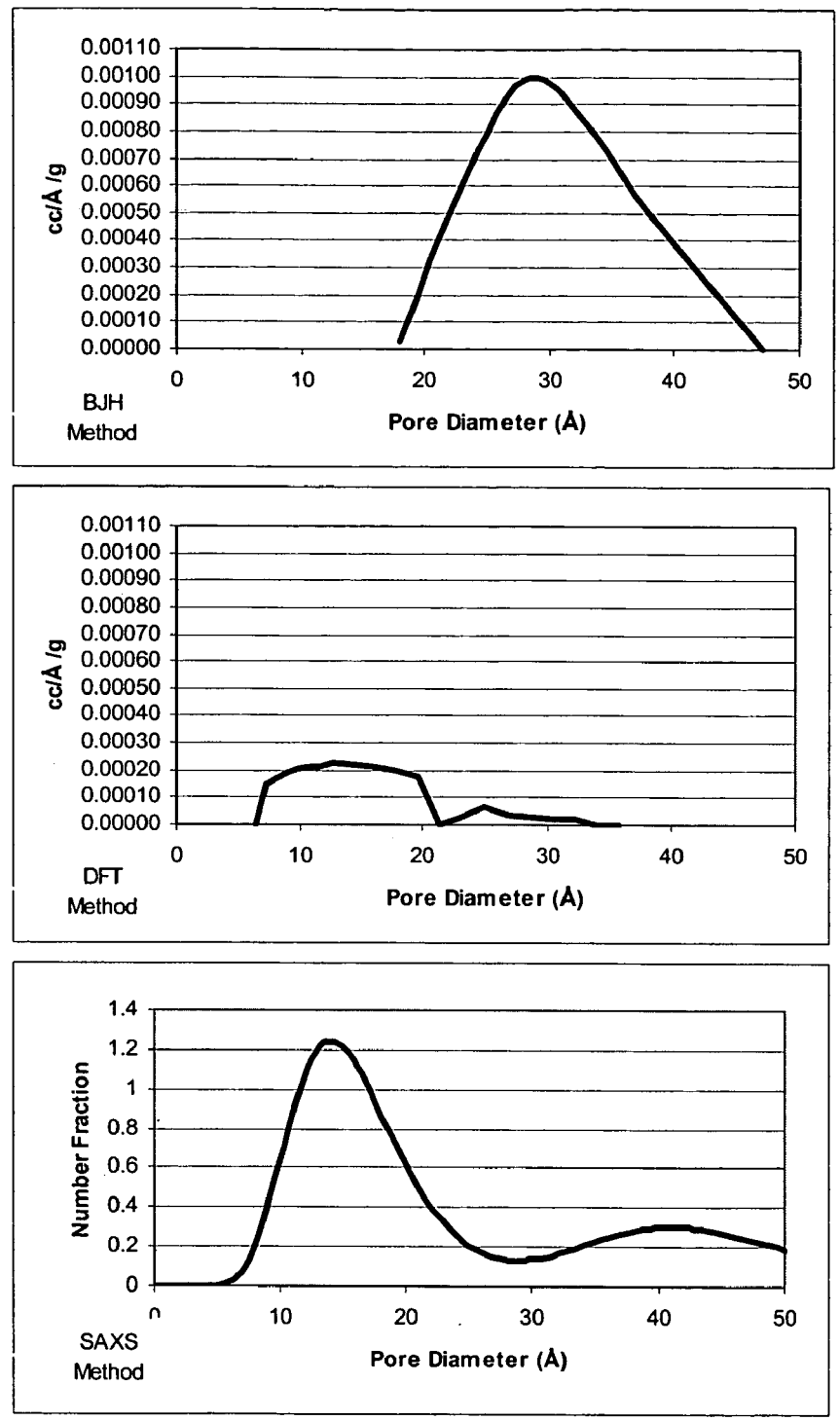
FIG. 29 Pore size/distribution from the two $N_2$ adsorption techniques along with the SAXS one for sample 24. Note the very close match in pore sizejdistribution by the different techniques. This sample contains both micropores and mesopores with average pore sizes of 15 and 35 Å, respectively.

As shown in Table 2, the radius of gyration (Guinier value) for all samples falls in the range of 15–25 Å indicating an average diameter of 35 Å. These results very closely match those obtained by the $N_2$ adsorption methods. Furthermore, the $N_2$ adsorption method DFT shows pores in the range of 8–18 Å in diameter. When the SAXS data were analyzed by a different technique for pore size determination (Private Communication), the samples indeed showed a bimodal nature in pore size. For sample 24, for instance, FIG. 29 shows the results from the two $N_2$ adsorption techniques along with the SAXS one. It is important to note the very close match in pore size and pore-size distribution by the different techniques. Therefore, these results prove that the samples contain both micropores and mesopores with average pore sizes of 15 and 35 Å, respectively.

Table 3 lists the pore size values for the samples characterized by all the three techniques. Again, the values are remarkably close to each other among the three different techniques. It is also interesting to note the percentages of pores with different diameters. In fact, there seems to be a trend. The two samples 17 and 18 synthesized at 800 psi have a lower percentage of smaller pores and higher percentage of larger pores compared to the other samples synthesized at lower pressures. According to their Porod values (3.27 and 4), samples 17 and 18 possess pores that are spherical with rough and smooth surfaces, respectively. In contrast to samples 17 and 18, all other samples listed in Table 3 are mass fractals.

Sample 23 seems to pose a discrepancy. The $N_2$ adsorption technique presents zero surface area and thus no pore size and pore-size distribution may be obtained from this technique. On the other hand, however, the SAXS method indicates the presence of dual size pores in this sample. In addition, the Porod value of 2.12 clearly points to the mass fractal nature of this sample. Therefore, the pores in this sample would have to be closed. When the pores are not interconnected, the $N_2$ gas cannot penetrate into the pores and the adsorption techniques would not render any results. However, in SAXS, even closed pores are detected and this would have to be the case for sample 23. Indeed, sample 23 was synthesized at a low pressure of 100 psi but high temperature of 400° C. and thus rapid diffusion due to high temperature must have caused pore isolation/containment.

Compared to sample 23, sample 22, which was synthesized under identical conditions but at a lower temperature of 300° C., has a high surface area of 265 $m^2/g$ as determined by $N_2$ adsorption indicating interconnected pores. Lower Porod and Guinier values for sample 22 further indicate more porous but smaller pores than sample 23. Sample 24 is also interesting. This sample, too, compared to sample 23, was synthesized under identical conditions but at a higher pressure of 500 psi. In contrast to the zero surface area of sample 23, the 15 $m^2/g$ surface area of sample 24 can only be attributed to the higher synthesis pressure. This is another indication on the importance of pressure during the synthesis process, i.e., in causing pores interconnection development, as well. These three samples 22, 23, and 24 were all synthesized by $N_2$ gas as the pressure medium during the HIP process, and all three showed very low k values.

With all synthesis conditions remaining the same but doubling the time and changing the synthesis gas to $H_2$, which is the case between samples 22 and 25, the k value improved from 0.65 to 3 mol/g.s despite a decrease in surface area from 265 to 170 $m^2/g$, respectively. The decrease in surface area for these two mass fractal samples is also manifested in the increase of Porod value from 1.83 to 2.42.

Compared to sample 25, successive increase in pressure was the only variable in synthesizing samples 16 and 18. All three possess about the same radius of gyration of 20 Å. Samples 25 and 16 are both mass fractals with the same Porod value of 2.45. This indicates that pressure increase from 100 to 500 psi had no influence on pore shape development in spite of increases in both surface area and k value. On the other hand, sample 18, which was synthesized at 800 psi and shows the highest k value among all the unpromoted samples, has a Porod value of 4, specifying it possesses spherical pores. Sample 18b, which is the same as sample 18 but after activity test, maintained the same Porod value of 4. A Porod value of 3.27 for sample 17 synthesized at 800 psi is also manifestation of spherical pores but with rough surface. Therefore, the desired pore shape for highest activity in the unpromoted samples seems to be spherical.

Despite identical synthesis conditions as in unpromoted samples 16 and 25, the two Co-promoted Samples 311 and 312 are surface fractal materials with 3.8 and 3.2 Porod values, respectively. After activity test, sample 311 became a mass fractal with a Porod value of 2.75, indicating that the material underwent some structural rearrangement. The decrease in its radius of gyration from 20 to 12 Å was also significant. This should have been due to large quantity of precursor used and thus the one-hour processing time was inadequate for complete synthesis. The absence of the regular XRD peaks and their appearance after activity test proved this point true. On the other hand, sample 321 maintained the same Porod value after activity test, and the decrease in its radius of gyration from 17 to 14 was not as significant as sample 311. It is important to mention here that a higher pressure than 500 psi is expected to be more suitable for the promoted samples as it proved to be for the unpromoted ones.

TABLE 2

The various values obtained for samples synthesized by HIP

| Sample | Precursor | P (psi) T (° C.) t (h) gas | k (mol/g · s) | Surface Area ($m^2/g$) | Guinier Value (Å) | Porod Value |
|---|---|---|---|---|---|---|
| 16 | TPenATM | 500 300 1 | 4.5 | 220 | 20 | 2.45 |
| 17 | TPenATM | 800 300 1 | | 215 | 22 | 3.27 |
| 18 | TPenATM | 800 300 1 | 6 | 250 | 21 | 4.0 |
| 18b | 18, after activity test | | | 235 | 23 | 4.0 |
| 22 | TPenATM | 100 300 2 $N_2$ | 0.65 | 265 | 15 | 1.83 |
| 23 | TPenATM | 100 400 2 $N_2$ | 0.12 | 0.0 | 24 | 2.12 |
| 24 | TPenATM | 500 400 2 $N_2$ | 2.4 | 15 | 20 | 2.47 |

TABLE 2-continued

The various values obtained for samples synthesized by HIP

| Sample | Precursor | P (psi) T (° C.) t (h) gas | k (mol/g · s) | Surface Area (m²/g) | Guinier Value (Å) | Porod Value |
|---|---|---|---|---|---|---|
| 25 | TPenATM | 100 300 1 | 3 | 170 | 22 | 2.42 |
| 311 | Co/ TPenATM | 500 300 1 | 9.5 | 65 | 20 | 3.8 |
| 311b | 311, after activity test | | | 40 | 12 | 2.75 |
| 321 | Co/ TPenATM | 500 300 1 | 8 | 30 | 17 | 3.2 |
| 321b | 321, after activity test | | | 22 | 14 | 3.3 |

TABLE 3

Average pore size values for the samples characterized by all the three techniques.
Guinier value (Radius of gyration) is shown in diameter for comparison

| Sample | DFT $d_1$ (Å) | BJH $d_2$ (Å) | SAXS $d_1$ (% $d_1$) (Å) | SAXS $d_2$ (% $d_2$) (Å) | Guinier Value in diameter (Å) | Porod Value | Surface Area (m²/g) |
|---|---|---|---|---|---|---|---|
| 16 | | | 12 (52) | 32 (48) | 40 | 2.45 | 220 |
| 17 | | | 16 (35) | 36 (65) | 44 | 3.27 | 215 |
| 18 | 15 | 35 | 28 (35) | 44 (65) | 46 | 4.0 | 250 |
| 22 | 15 | 30 | | | 30 | 1.83 | 265 |
| 23 | ?? | ?? | 14 (64) | 37 (36) | 48 | 2.12 | 0 |
| 24 | 15 | 35 | 14 (64) | 41 (36) | 40 | 2.47 | 15 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references are specifically incorporated herein by reference.

U.S. Pat. No. 4,243,554
U.S. Pat. No. 4,431,747
U.S. Pat. No. 4,508,847
U.S. Pat. No. 4,514,517
U.S. Pat. No. 4,528,089
U.S. Pat. No. 4,581,125
U.S. Pat. No. 4,650,563
U.S. Pat. No. 4,820,677
U.S. Pat. No. 4,880,761
U.S. Pat. No. 4,839,326
U.S. Pat. No. 5,057,296
U.S. Pat. No. 5,102,643
U.S. Pat. No. 5,565,142
U.S. Pat. No. 6,156,693
U.S. Pat. No. 6,299,760
U.S. Pat. No. 687,842
Canadian Patent No. 680,160
Alonso et al., 17th North American Catalysis Society Meeting, Ontario, Canada, Jun. 3–8, 2001.
Alonso et al., *Catalysis Letters* 52:55, 1998a.
Alonso et al., *Catalysis Today* 43:117, 1998b.
Alonso et al., *Inorg. Chim. Acta* 274:108, 1998c.
Alonso et al., *Inorg. Chim. Acta* 316:105, 2001a.
Alonso et al., *Inorg. Chim. Acta* 325:193, 2001b.
Atkinson et al., *Metallurgical and Materials Transactions A* 31A:2981, 2000.
Beck et al., *J. Am. Chem. Soc.* 114:10834, 1992.
Brito et al., *Thermochimica Acta* 256:325, 1995.
Brownlee, In: *Statistical Theory and Methodology in Science and Engineering*, 2nd Edition, Wiley, N.Y., 590, 1965.
Byrappa, In: *Hydrothermal Growth of Crystals*, 1–365, Pergamon Press, Oxford, UK, 1992.
Chianelli et al., *Catalysis Today* 53:357, 1999.
Chianelli et al., *Inorg. Chem* 17:2758, 1978.
Chianelli, *International Reviews in Physical Chemistry* 2:127, 1982.
Corleis, *Ann Chem.* 232:244, 1886.
Cramer et al., *J. Am. Chem. Soc.* 100:339, 1978a
Cramer et al., *J. Am. Chem. Soc.* 100:3814, 1978b.
EPA Regulatory Announcement EPA420-F-00-057, December 2000.
*Federal Register* 65:6701, 2000.
Frommell et al., In: *Proc. 12th North American Meeting of Catalytic Soc.*, Lexington, Ky., PD-38, 1991.
Frye et al., *Chem. Eng. Prog.* 63:66, 1967.
Fuentes et al., *J. Catal.* 113:535, 1988.
Girgis et al., *Ind. Eng. Chem. Res.* 30:2021, 1991.
Houalla et al., *J. CataL.* 61:523, 1980.
Inamura et al., *J. Catal.* 147:515, 1994.
Iwata et al., *Cat. Today* 45:353, 1998.
Jiang et al., *Chem.* 8:721, 1998.
Kistler, *Nature* 127:741, 1931.
Kresge et al., *Nature* 359:710, 1992.
Kruss, *Ann. Chem.* 225:1, 1884.
Land et al., *J. Non-Cryst. Solids* 283:11, 2001.
Laudise, In: *The Growth of Single Crystals*, 278–281, Prentice-Hall, Englewood Cliffs, N.J., 1970.
Leist et al., *Chem.* 8:241, 1998.
Liang et al., *J. Non-crystalline Solids* 79:251, 1986.
Lobachev, In: *Crystallization Processes under Hydrothermal Conditions*, 1–255, Consultants Bureau, NY, 1973.
Ma et al., *Microporous and Mesoporous Materials*, 37:243–252, 2000.
McDonald et al., *Inorg. Chem. Acta* 72:205, 1983.
Morey and Niggli, *J. Am. Chem. Soc.*, 35:1086–1130, 1913.
Müller and Newton, In: *Nitrogen Fixation: Chemical, Biochemical, Genetics Interfaces*, Plenum Press, NY, 1982.
Muller, *Coord. Chem.* 432:127, 1977.
Müller, In: *Transition Metal Chemistry-Current Problems of general, Biological and catalytical relevances*, Verlag Chemie, Weinheim, 1981.
Pan et al., *Inorg. Chem.* 22:672, 1983.
Prasad et al., *J. Inorg. Nucl. Chem.* 35:1895, 1973.
Rabenau, *Angew. Chem.*, (English Ed.), 24:1026–1040, 1985.

Ramanathan et al., *J. Catal.* 95:249, 1985.
Roy, *J. Solid State Chem.*, 111:11–17, 1994.
Smith et al., *J. Non-Cryst. Solids* 188:191, 1995.
Swain, *Oil & Gas J.* 1:62m 1993.
Topsoe, B. S. Clausen, F. E. Massoth, *Hydrotreating Catalysis* 157, 1996.
Vasudevan et al., *Appl. Catal.* 112:161, 1994.
Vrinat et al., *Bull. Soc. Chim. Belg.* 93:637, 1984.
Waldron et al., *Sintering*, Heyden, London, p. 62, 1978.
Wasielewski et al., *Proc 2nd Int. Conf. Superalloys Processing*, TMS-AIME, Champion, Pa., pp. D-1-D-24, 1972.
Weisser et al., In: *Sulphide Catalysts: Their Properties and Applications*, Pergamon Press, NY, 1973.
Wilkinson et al., *J. Catal.* 171:325, 1997.
Yoshimura and Suda, In: *Hydroxyapatite and Related Materials*, Brown and Constanz (Eds), 45–72, CRC Press, Inc., 1994.
Zhang et al., *J. Catal.* 157:53, 1995.

What is claimed is:

1. A process for producing a metal sulfide sieve material comprising:
heating a composition comprising a molybdate or thiomolybdate salt in a pressurized gas environment devoid of any solvent to decompose fully the salt, wherein pores are formed in the salt.

2. The process of claim 1, wherein the metal sulfide sieve is a catalyst of the formula $MoS_{2-x}C_x$ with $0 \leq x \leq 1$.

3. The process of claim 1, wherein the composition further comprises tungsten.

4. The process of claim 3, wherein the metal sulfide sieve is a catalyst of the formula $Mo_{1-y}W_yS_{2-x}C_x$ with $0<y<1$ and $0 \leq x \leq 1$.

5. The process of claim 3, wherein the tungsten is part of the molybdate or thiomolybdate salt.

6. The process of claim 3, wherein the composition comprises a tungstate or thiotungstate salt.

7. The process of claim 1, wherein the salt is a sulfide salt.

8. The process of claim 1, wherein the salt is an oxide salt.

9. The process of claim 1, wherein the salt is selected from the group consisting of ammonium thiomolybdate, alkyl ammonium thiomolybdate, tetrapentylammonium thiomolybdate, and polyalkyl ammonium thiomolybdate.

10. The process of claim 1, wherein the gas is pressurized to between about 20 and 5000 psig.

11. The process of claim 10, wherein the gas is pressurized up to about 1500 psig.

12. The process of claim 10, wherein the gas is pressurized to about 500 psig.

13. The process of claim 1, wherein heating occurs at a temperature between at least about 100° C. and at most about 70% of the melting point of the composition.

14. The process of claim 13, wherein the temperature is about 250° C. to about 400° C.

15. The process of claim 14, wherein the temperature is about 300° C. to about 350° C.

16. The process of claim 1, wherein the pressurized gas environment is a flowing gas environment.

17. The process of claim 16, wherein the flowing gas environment is closed during all or part of the synthesis of the metal sulfide sieve and open after synthesis of the metal sulfide sieve to remove undesirable organic reaction products.

18. The process of claim 1, wherein the pressurized gas environment comprises $H_2S$ and $H_2$ gases.

19. The process of claim 1, wherein the pressurized gas environment comprises $H_2S$ and $N_2$ gases.

20. The process of claim 1, further comprising compacting the salt prior to heating.

21. The process of claim 1, further comprising breaking the salt into smaller pieces prior to heating.

22. The process of claim 1, wherein the molybdate or thiomolybdate salt is impregnated with a promoter salt.

23. The process of claim 22, wherein the promoter salt is comprised of a metal selected from the group consisting of Co, Ni, Fe, and Ru.

24. The process of claim 1, wherein the composition further comprises an inorganic binder selected from the group consisting of $Al_2O_3$, $TiO_2$, $SiO_2$, and MgO.

25. The process of claim 22, wherein the composition further comprises an inorganic binder selected from the group consisting of $Al_2O_3$, $TiO_2$, $SiO_2$, and MgO.

* * * * *

UNITED STATES PATENT AND TRADEMARK OFFICE
CERTIFICATE OF CORRECTION

PATENT NO. : 7,132,386 B2  Page 1 of 1
APPLICATION NO. : 10/819480
DATED : November 7, 2006
INVENTOR(S) : Siadati et al.

It is certified that error appears in the above-identified patent and that said Letters Patent is hereby corrected as shown below:

On the title page, item (73), "Assignee", please add --Centro de Investigación en Materiales Avanzados, S.C., Chihuahua (MX)--.

Signed and Sealed this

Twenty-second Day of January, 2008

JON W. DUDAS
*Director of the United States Patent and Trademark Office*